(12) United States Patent
Yasue et al.

(10) Patent No.: US 7,236,701 B2
(45) Date of Patent: Jun. 26, 2007

(54) OPTICAL TRANSMISSION SYSTEM FOR PERFORMING COMMUNICATION USING A PLURALITY OF COMMUNICATION LINES

(75) Inventors: Toshihiko Yasue, Moriguchi (JP); Hiroyuki Sasai, Katano (JP); Masaru Fuse, Neyagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 707 days.

(21) Appl. No.: 10/648,428

(22) Filed: Aug. 27, 2003

(65) Prior Publication Data
US 2004/0156644 A1    Aug. 12, 2004

(30) Foreign Application Priority Data
Aug. 28, 2002    (JP)    .............................. 2002-249330

(51) Int. Cl.
  H04J 4/00    (2006.01)
  H04J 14/00   (2006.01)
(52) U.S. Cl. ........................... 398/76; 398/75; 398/140
(58) Field of Classification Search ............ 398/25–38, 398/187, 52, 198, 46, 47, 176; 370/431–463, 370/249–252, 268, 300; 375/298, 261
See application file for complete search history.

(56) References Cited

U.S. PATENT DOCUMENTS

| 4,722,081 A * | 1/1988 | Fujito et al. .................. 398/76 |
| 4,893,300 A * | 1/1990 | Carlin et al. .................. 398/76 |
| 5,214,656 A * | 5/1993 | Chung et al. ................ 714/758 |
| 5,243,629 A * | 9/1993 | Wei ............................. 375/299 |
| 5,351,148 A * | 9/1994 | Maeda et al. ................. 398/76 |
| 5,680,238 A * | 10/1997 | Masuda ....................... 398/76 |
| 6,078,412 A | 6/2000 | Fuse et al. |
| 6,134,273 A * | 10/2000 | Wu et al. .................... 375/261 |
| 6,175,550 B1 * | 1/2001 | Van Nee ..................... 370/206 |
| 2002/0024694 A1 * | 2/2002 | Newell et al. .............. 359/124 |

FOREIGN PATENT DOCUMENTS

| JP | 9-116506 | 5/1997 |
| WO | 00/42727 | 7/2000 |
| WO | 01/97412 | 12/2001 |

* cited by examiner

Primary Examiner—Kenneth Vanderpuye
Assistant Examiner—Luis Garcia
(74) Attorney, Agent, or Firm—Wenderoth, Lind & Ponack, L.L.P.

(57) ABSTRACT

The present invention provides a low-cost optical transmission system using a plurality of subscriber lines which is capable of efficiently utilizing an optical transmission path. A communication status observing section 116 in a transmitting device 1 classifies subscribers into a plurality of groups based on a communication status at each subscriber end, and outputs constellation level information and level information which are different for each group. For each constant cycle, a modulation control section 117 and a gain control section 118 respectively set a QAM constellation level and a signal level which are different for each group and used in a basic modulating section 103.

20 Claims, 12 Drawing Sheets

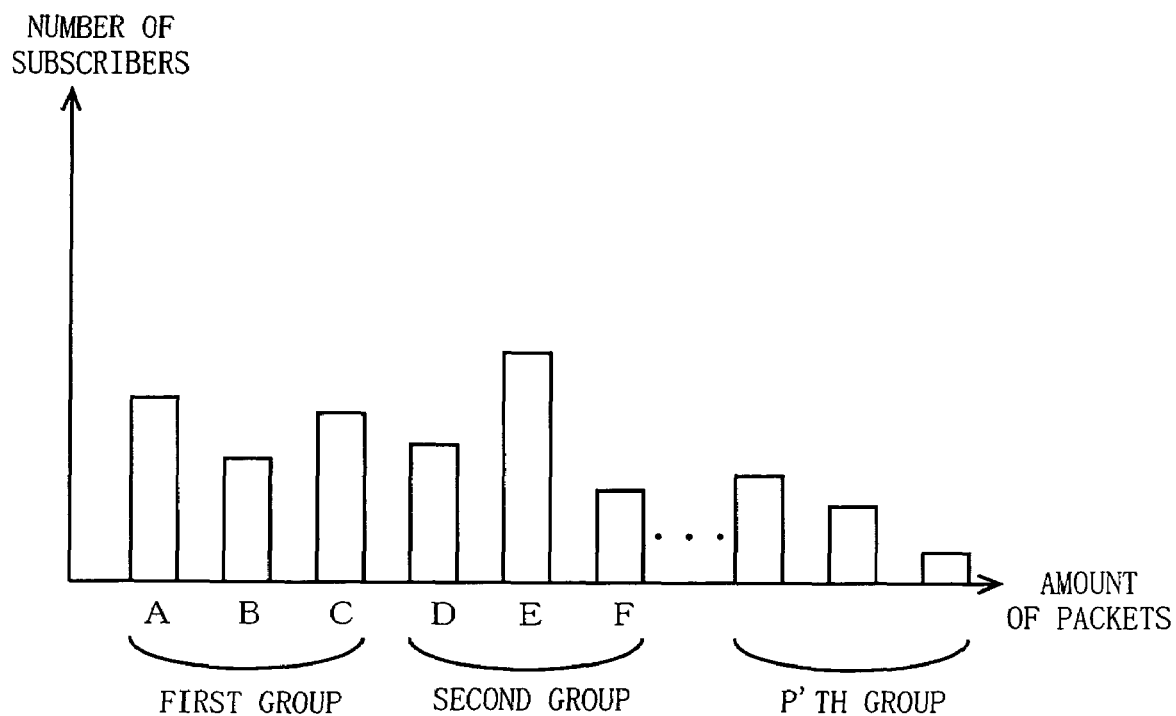

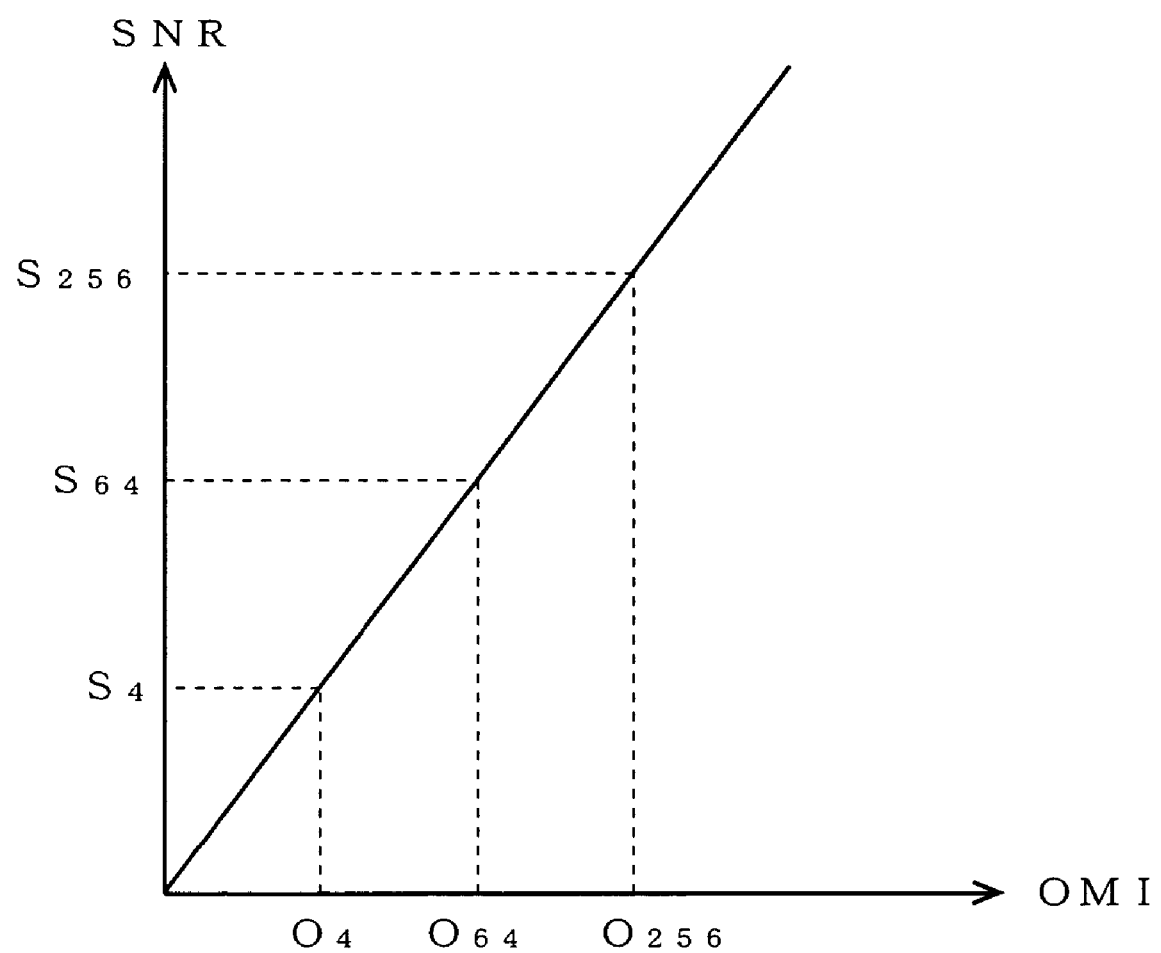

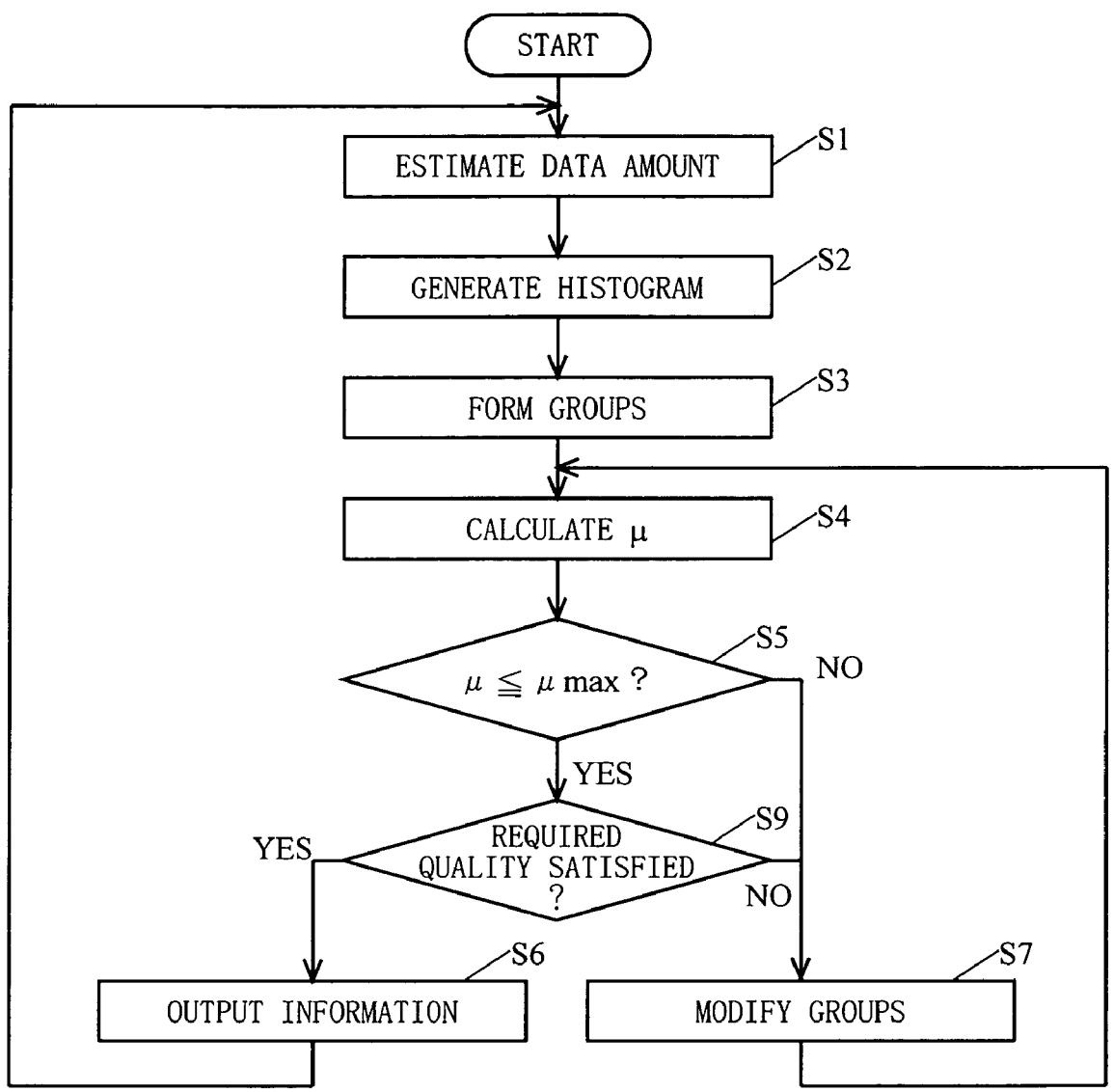
F I G. 1 2

OPTICAL TRANSMISSION SYSTEM FOR PERFORMING COMMUNICATION USING A PLURALITY OF COMMUNICATION LINES

BACKGROUND OF THE INVENTION

1. Field of the Invention

The present invention relates to an optical transmission system, and more particularly to an optical transmission system for performing communication using a plurality of communication lines.

2. Description of the Background Art

As an optical transmission system for performing communication using a plurality of communication lines, there is a known technology as follows. FIG. 13 is a block diagram illustrating a configuration of a conventional optical transmission system. In FIG. 13, the conventional optical transmission system includes a multiplexing section 81, an optical modulating section 82, an optical transmission path 83, an optical detecting section 84, a demultiplexing section 85, first to n'th basic modulating sections $86_{-1}$ to $86_{-n}$, first to n'th electric or wireless transmission paths $87_{-1}$ to $87_{-n}$, and first to n'th demodulating sections $88_{-1}$ to $88_{-n}$. An operation of the conventional optical transmission system illustrated in FIG. 13 will be described below.

The multiplexing section 81 multiplexes a plurality of incoming digital data signals. The optical modulating section 82 converts a multiplexed signal obtained by the multiplexing section 81 into an optical signal, and transmits the optical signal over the optical transmission path 83. The optical detecting section 84 reconverts the optical signal transmitted via the optical transmission path 83 into the multiplexed signal. The demultiplexing section 85 demultiplexes the multiplexed signal, which is obtained by reconversion via the optical detecting section 84, into a plurality of digital data signals. The first to n'th basic modulating sections $86_{-1}$ to $86_{-n}$ convert the plurality of digital data signals, which are obtained by demultiplexing via the demultiplexing section 85, into prescribed modulated signals, and then transmit the prescribed modulated signals over the first to n'th electric transmission paths $87_{-1}$ to $87_{-n}$. The first to n'th demodulating sections $88_{-1}$ to $88_{-n}$ reconvert the modulated signals transmitted via the first to n'th electric or wireless transmission paths $87_{-1}$ to $87_{-n}$ back into the plurality of original digital data signals.

In general, the conventional optical transmission system as illustrated in FIG. 13 is applicable to a digital subscriber line (DSL) service. In the DSL service, an optical transmitting facility 801 including the optical modulating section 82 is provided in a central office (CO) of a telephone service provider or the like. An optical receiving device 802, which includes the optical detecting section 84 and the first to n'th basic modulating sections $86_{-1}$ to $86_{-n}$, is provided in an elevated position of a telegraph pole, on a sidewall of a subscriber's house, or in a common facility of a multi-dwelling unit (MDU) or a multi-tenant unit (MTU). Each of first to n'th subscriber terminals $803_{-1}$ to $803_{-n}$ including their respective first to n'th demodulating sections $88_{-1}$ to $88_{-n}$ is provided in a subscriber's house or a plurality of subscribers' houses. The "subscriber terminal" as described herein is so called the "customer premise equipment (CPE) device". For each of the electric or wireless transmission paths $87_{-1}$ to $87_{-n}$, a subscriber line is used.

In a conventional optical transmission system as described above, it is possible to improve a transmission characteristic of transmitting information across a transmission path from a central office facility to a subscriber terminal by using low-loss optical fibers to form almost the entire transmission path and by transmitting digital signals through that section. Thus, the transmission path has improved performance in transmission quality, transmission rate, etc. It is also possible to simplify the subscriber's in-house network wiring and thereby to reduce the network wiring's cost by using electric lines, such as twisted-pair lines. The subscriber's electric lines thereby form an end portion (from an optical receiving device to the subscriber terminal) of the entire transmission path, through which the DSL modulated signals are transmitted. In this manner, according to the conventional optical transmission system, it is simultaneously possible to lengthen the distance of the entire transmission system and to facilitate installation and cost-effectiveness of the subscriber's in-house facility.

However, the conventional optical transmission system as described above has a problem in that when there is an increase in the number of subscribers, an optical receiving device connected to subscriber terminals is required to be large-scale, resulting in cost increase of the optical receiving device. More specifically, in the configuration illustrated in FIG. 13, the optical receiving device 802 is required to include the first to n'th basic modulating sections $86_{-1}$ to $86_{-n}$ in accordance with the number of subscribers accommodated in the optical transmission system, and therefore the optical receiving device 802 is required to be upsized, thereby increasing the cost of the optical receiving device 802. Since the optical receiving device 802 located in the vicinity of the subscriber is upsized and therefore the cost thereof is increased, the cost effectiveness of the entire optical transmission system is significantly worsened.

In order to solve the above problem, it is conceivable that conversion from a digital signal to a modulated signal is performed in an optical transmitting facility, for example. Specifically, the optical transmission facility generates a plurality of modulated signals corresponding to all the subscriber lines, and sends the modulated signals over an optical transmission path. In this case, the optical receiving device does not require a basic modulating section, and therefore it is possible to solve problems concerning upsizing and cost increase of the optical receiving device.

In the case where the optical transmitting facility performs modulation, when modulation parameters for use in modulation are equally set for all the digital data signals to be transmitted to all the subscriber terminals, a fixed data rate is set for data to be transmitted to all the subscriber terminals. In this manner, when a fixed data rate is set regardless of a communication status of each subscriber terminal, the optical transmission path cannot be efficiently utilized. For example, consider a case where a great deal of data is transmitted to a subscriber terminal A and no data is transmitted to another subscriber terminal B. In this case, even if the optical transmission path has room for transmitting larger amount of data, it is not possible to increase the data rate for the subscriber terminal A. That is, it is not possible to efficiently utilize the optical transmission path.

SUMMARY OF THE INVENTION

Therefore, an object of the present invention is to provide a low-cost optical transmission system using a plurality of communication lines which is capable of efficiently utilizing an optical transmission path.

The present invention has the following features to attain the object mentioned above.

A first aspect of the present invention is directed to an optical transmitting device for transmitting an optical signal via an optical transmission path to a receiving device connected via prescribed communication lines to first to n'th terminal devices (where n is an integer of 2 or more). The optical transmitting device includes: a modulating section, an optical transmitting section, a data amount estimating section, and a parameter control section. The modulating section generates first to n'th modulated signals based on first to n'th data signals to be transmitted to the first to n'th terminal devices, respectively, and the first to n'th modulated signals are obtained by modulation with individual modulation parameters. The optical transmitting section converts the first to n'th modulated signals generated by the modulating section into an optical signal, and transmits the optical signal to the receiving device via the optical transmission path. The data amount estimating section estimates an amount of data for each of the first to n'th data signals. The parameter control section sets the individual modulation parameters used in the modulating section based on amounts of data for the first to n'th data signals estimated by the data amount estimating section.

In a second aspect, the modulating section includes a frequency converting section for performing frequency conversion on the first to n'th modulated signals so as to have respective different frequencies.

In a third aspect, the data amount estimating section estimates the amount of data for each of the first to n'th data signals based on the data signal itself.

In a fourth aspect, the data amount estimating section previously holds information about each of the first to n'th terminal devices with respect to use of a corresponding one of the prescribed communication lines, and estimates the amount of data for each of the first to n'th data signals based on the information and a current time.

In a fifth aspect, the parameter control section includes: a group classifying section for classifying the first to n'th data signals into a plurality of groups in accordance with the amount of data estimated for each of the first to n'th data signals by the data amount estimating section; and a parameter setting section for setting modulation parameters at the same value for each of data signals classified into the same group by the group classifying section.

In a sixth aspect, the parameter control section further includes a histogram generating section for generating, based on amounts of data estimated by the data amount estimating section, a histogram in which the amounts of data are divided into prescribed units of divisions, and the group classifying section uses the histogram generated by the histogram generating section to form the plurality of groups.

In a seventh aspect, the parameter control section sets the individual modulation parameters so as to have values within a range such that the first to n'th modulated signals satisfy a condition concerning a transmission quality in the optical transmission path.

In an eighth aspect, the parameter control section further includes: a condition determination section for determining, based on the individual modulation parameters, whether the first to n'th modulated signals satisfy the condition concerning the transmission quality in the optical transmission path; and a modifying section for modifying the individual modulation parameters when the condition determination section determines that the condition is not satisfied.

In a ninth aspect, the condition is such that a total mean square root optical modulation index, which is determined based on the individual modulation parameters of the first to n'th modulated signals, is lower than or equal to a prescribed value.

In a tenth aspect, the individual modulation parameters include constellation levels used for performing quadrature amplitude modulation on each of the first to n'th data signals, and signal levels of modulated signals obtained by the quadrature amplitude modulation.

In an eleventh aspect, the individual modulation parameters include the number of subcarriers used for performing discrete multi-tone modulation on each of the first to n'th data signals.

A twelfth aspect is directed to an optical transmission system which includes: the above-described transmitting device for transmitting a signal via an optical transmission path; a receiving device for receiving the signal transmitted via the optical transmission path; and first to n'th (where n is an integer of 2 or more) terminal devices connected via respective prescribed communication lines to the receiving device. The receiving device includes: an optical receiving section for receiving an optical signal transmitted via the optical transmission path and for converting the optical signal into an electric signal; and an electric transmitting section for transmitting the first to n'th modulated signals contained in the electric signal, which is obtained by conversion via the optical receiving section, to the first to n'th terminals to which the first to n'th modulated signals should be transmitted via the prescribed communication lines. Each of first to n'th terminal devices includes a demodulating section for demodulating a modulated signal transmitted via a corresponding one of the prescribed communication lines.

In a thirteenth aspect, the optical transmission system further comprises a first transmission path connected between the receiving device and the transmitting device. The receiving device further includes: a distortion monitoring section for detecting a distortion level at a prescribed frequency in an electric signal obtained by optical-to-electrical conversion via the optical receiving section; and a distortion information transmitting section for transmitting distortion level information about a distortion level detected by the distortion monitoring section to the transmitting device via the first transmission path. The parameter control section sets the individual modulation parameters such that the distortion level indicated by the distortion level information transmitted via the first transmission path becomes lower than or equal to a prescribed distortion level value.

In a fourteenth aspect, the optical transmission system further includes second transmission paths connected between each of the first to n'th terminal devices and the transmitting device. Each of the first to n'th terminal devices further includes: a quality detecting section for detecting signal quality of the modulated signals transmitted via the prescribed communication lines; and a quality information transmitting device for transmitting the signal quality information about the signal quality detected by the quality detecting section via the prescribed communication lines. The parameter control section sets the individual modulation parameters such that the signal quality indicated by the signal quality information transmitted via the second transmission path satisfies a prescribed requirement.

As described above, in the first aspect, the modulating section is provided in the transmitting device. Accordingly, it is not necessary to provide the modulating section in the receiving device, and therefore it is possible to prevent upsizing and cost increase of the receiving device. Thus, it is possible to provide an optical transmission system at low cost.

Further, in the first aspect, a constellation level and a signal level of a modulated signal are changed in accordance with the amount of data contained in a data signal. Accordingly, it is possible to suitably set communication quality of a signal transmitted via each communication line in accordance with a communication status for each communication line connected between the receiving device and a terminal device. For example, the value of a modulation parameter is set for a communication line which transmits only a small amount of data, such that a transmission speed becomes low. Conversely, the value of a modulation parameter is set for a communication line which transmits a large amount of data, such that a transmission speed becomes high. Thus, it is possible to efficiently utilize the optical transmission path.

As described above, in the second aspect, optical transmission is performed after the first to n'th modulated signals are frequency-multiplexed. Thus, it is possible to reliably perform the optical transmission.

As described above, in the third aspect, the amount of data contained in a data signal is estimated from the data signal itself. Thus, it is possible to estimate the amount of data with accuracy.

As described above, in the fourth aspect, the amount of data is estimated based on previously obtained information about each terminal device. Thus, it is not necessary to detect a data signal, and the amount of data can be estimated using a simply-configured device.

As described above, in the fifth aspect, data signals for transmitting equivalent amounts of data are assigned to the same group. Moreover, modulation parameters having the same values are set for the data signals belonging in the same group. Since the values of modulation parameters are set on a group-by-group basis, the number of values of the modulation parameters prepared by a control section are only required to be as many as the number of groups. Thus, it is possible to facilitate easy setting of modulation parameters.

As described above, in the sixth aspect, groups are formed using a histogram. The formation of groups is easily performed by using the histogram.

As described above, in the seventh aspect, values of the individual modulation parameters of the first to n'th modulated signals are determined within a range such that the first to n'th modulated signals satisfy a condition concerning a transmission quality in the optical transmission path. In the case of the first aspect where the values of the individual parameters can be dynamically determined, when the values of the modulation parameters are set so as to increase a transmission speed for each modulated signal, there is a possibility that a transmission capability required for transmitting all the modulated signals might exceed the transmission capability allowed for the optical transmission path. On the other hand, in the seventh aspect, the values of the modulation parameters are not set such that the transmission capability required for transmitting all the modulated signals exceeds transmission capability allowed for the optical transmission path. Thus, it is consistently possible to reliably conduct transmission via the optical transmission path.

As described above, in the eighth aspect, when a modulation parameter is set so as to have a value which does not satisfy a condition, the modulation parameter is modified. Thus, it is possible to correctly conduct a determination as to the condition.

As described above, in the ninth aspect, a total mean square root optical modulation index (hereinafter simply referred to as the "total optical modulation index" or the "total OMI") is used for determining whether a condition concerning transmission quality in the optical transmission path is satisfied. The total optical modulation index is determined by the after mentioned expression, and can be calculated based on values of individual modulation parameters (including an OMI per signal) of the first to n'th modulated signals. Thus, it is possible to readily conduct the determination as to the condition by using the total optical modulation index.

According to the tenth aspect, the present invention is also applicable to an optical transmission system including a modulating section which is based on quadrature amplitude modulation (QAM).

According to the eleventh aspect, the present invention is also applicable to an optical transmission system including a modulating section which is based on discrete multi-tone (DMT) modulation.

The twelfth aspect can also achieve effects similar to those achieved by the first aspect.

As described above, in the thirteenth aspect, it is possible to determine modulation parameters in consideration of the influence of distortion on signals in the receiving device. Thus, it is possible to reliably prevent excessive degradation of signal quality.

As described above, in the fourteenth aspect, it is possible to determine modulation parameters in consideration of signal quality in each terminal device. Thus, it is possible to reliably prevent excessive degradation of signal quality.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a diagram illustrating an exemplary histogram generated in the communication status observing section 116 illustrated in FIG. 1;

FIG. 5 illustrates a table used for a group formation process performed in the communication status observing section 116 illustrated in FIG. 1;

FIG. 6 is a graph illustrating typical relationships used in the first embodiment between required optical modulation indices (OMIs) and signal-to-noise ratios (SNRs);

FIG. 12 is a flowchart illustrating the procedure of processing performed in a communication status observing section 116 according to the third embodiment.

DESCRIPTION OF THE PREFERRED EMBODIMENTS

First Embodiment

Figure 1:
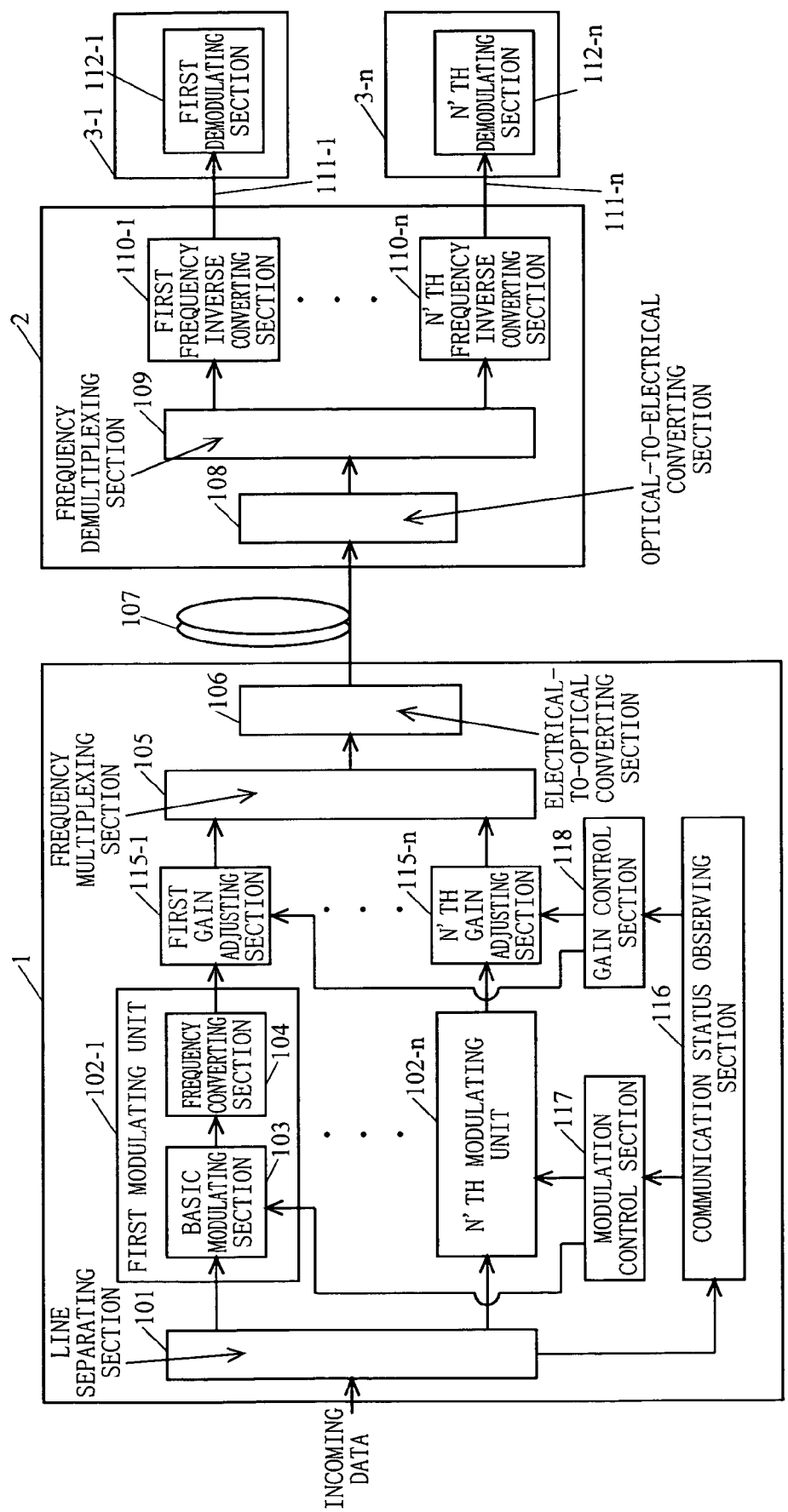
FIG. 1 is a block diagram illustrating a configuration of an optical transmission system according to a first embodiment.

An optical transmission system according to a first embodiment of the present invention will be described below. FIG. 1 is a block diagram illustrating a configuration of the optical transmission system according to the first embodiment. In FIG. 1, the optical transmission system includes a transmitting device 1, an optical transmission path 107, a receiving device 2, first to n'th subscriber lines $111_{-1}$ to $111_{-n}$, and first to n'th terminal devices $3_{-1}$ to $3_{-n}$. The transmitting device 1 is provided in, for example, a central office (CO) of an Internet service provider, a telephone service provider, or the like, and connected to the receiving device 2 via the optical transmission path 107. The receiving device 2 is provided in, for example, a common facility or the like of a multi-dwelling unit (MDU) or a multi-tenant unit (MTU), and connected to first to n'th demodulating sections $112_{-1}$ to $112_{-n}$ via subscriber lines (the first to n'th subscriber lines $111_{-1}$ to $111_{-n}$). For example, telephone lines are used as the subscriber lines. Each of the first to n'th terminal devices $3_{-1}$ to $3_{-n}$ is provided in a subscriber's house. The optical transmission system according to the first embodiment is provided in the form of so-called "fiber to the building (FTTB)" or "fiber to the curb (FTTC)", and employs a "very high speed digital subscriber line (VDSL)" technology.

The transmitting device 1 includes: a line separating section 101; first to n'th modulating units $102_{-1}$ to $102_{-n}$; first to n'th gain adjusting sections $115_{-1}$ to $115_{-n}$; a frequency multiplexing section 105; an electrical-to-optical converting section 106; a communication status observing section 116; a modulation control section 117; and a gain control section 118. The first modulating unit $102_{-1}$ includes a basic modulating section 103 and a frequency converting section 104. Although not shown in FIG. 1, a configuration of a k'th modulating unit $102_{-k}$ (where k is an integer in the range between 2 and n; k also refers to such an integer in following descriptions) is the same as that of the first modulating unit $102_{-1}$. The receiving device 2 includes an optical-to-electrical converting section 108, a frequency demultiplexing section 109, and first to n'th frequency inverse-converting sections $110_{-1}$ to $110_{-n}$. The first to n'th terminal devices $3_{-1}$ to $3_{-n}$ include the first to n'th demodulating sections $112_{-1}$ to $112_{-n}$, respectively. Described below is an operation of transmitting a data signal from the transmitting device 1 (the central office) to each of the first to n'th terminal devices $3_{-1}$ to $3_{-n}$ (each subscriber's house) in the optical transmission system according to the first embodiment.

The optical transmission system performs communication using the first to n'th subscriber lines $111_{-1}$ to $111_{-n}$, the transmitting device 1, and the receiving device 2. An operation of the transmitting device 1 will now be described. The line separating section 101 separates an incoming data signal into first to n'th data signals and outputs the first to n'th data signals. It is assumed that the first to n'th data signals are respectively transmitted to the first to n'th demodulating sections $112_{-1}$ to $112_{-n}$ via the first to n'th subscriber lines $111_{-1}$ to $111_{-n}$.

Each data signal obtained by separation via the line separating section 101 is converted into a modulated signal via a modulating unit and a gain adjusting section. Specifically, each of the first to n'th data signals are input to a corresponding one of the first to n'th modulating units $102_{-1}$ to $102_{-n}$. Operations of the first modulating unit $102_{-1}$ and the first gain adjusting section $115_{-1}$ will be described below as examples of the first to n'th modulating units $102_{-1}$ to $102_{-n}$ and the first to n'th gain adjusting sections $115_{-1}$ to $115_{-n}$. The first modulating unit $102_{-1}$ is provided so as to be associated with a first data signal to be outputted by the line separating section 101. The first modulating unit $102_{-1}$ converts, based on a prescribed modulation parameter (a prescribed constellation level), the first data signal into a first frequency-converted modulated signal and outputs the frequency-converted modulated signal. The term "frequency-converted modulated signal" as described herein refers to a modulated signal obtained by frequency conversion into a signal in a prescribed frequency band. Here, a signal outputted from the k'th modulating unit $102_{-k}$ is referred to as the "k'th frequency-converted modulated signal".

More detailed description of the operation of the first modulating unit $102_{-1}$ is as follows. The basic modulating section 103 modulates, based on a prescribed constellation level, the first data signal outputted by the line separating section 101 into a prescribed modulated signal, and outputs the prescribed modulated signal. In the first embodiment, the basic modulating section 103 performs M-ary quadrature amplitude modulation (QAM) using a prescribed constellation level. Hereinbelow, the term "constellation level" refers to a value of "M". The basic modulating section 103 is also able to perform modulation by suitably changing a constellation level. The prescribed constellation level is inputted from the modulation control section 117 to the basic modulating section 103. The value of the prescribed constellation level is determined by the communication status observing section 116. The details of setting of the prescribed constellation level will be described later. The frequency converting section 104 performs frequency conversion on the modulated signal outputted by the basic modulating section 103 so as to have a prescribed frequency band, and outputs a resultant signal. The frequency conversion performed by the frequency converting section 104 will be described below.

Figure 2A:
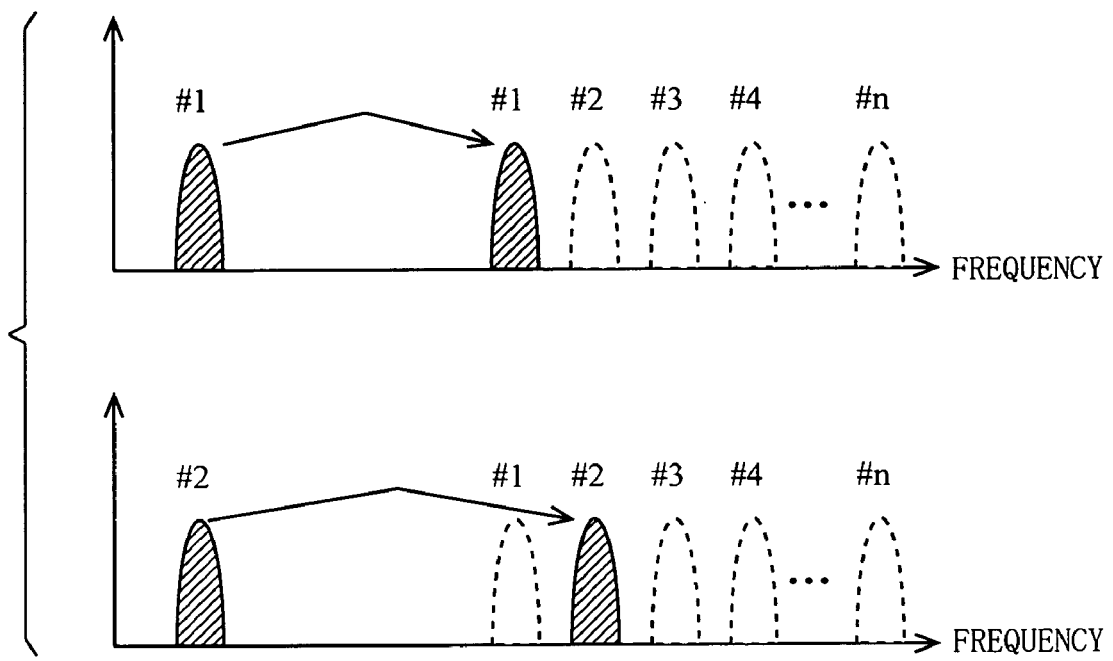
FIGS. 2A and 2B are diagrams for explaining a frequency conversion method according to the first embodiment.
Figure 2B:
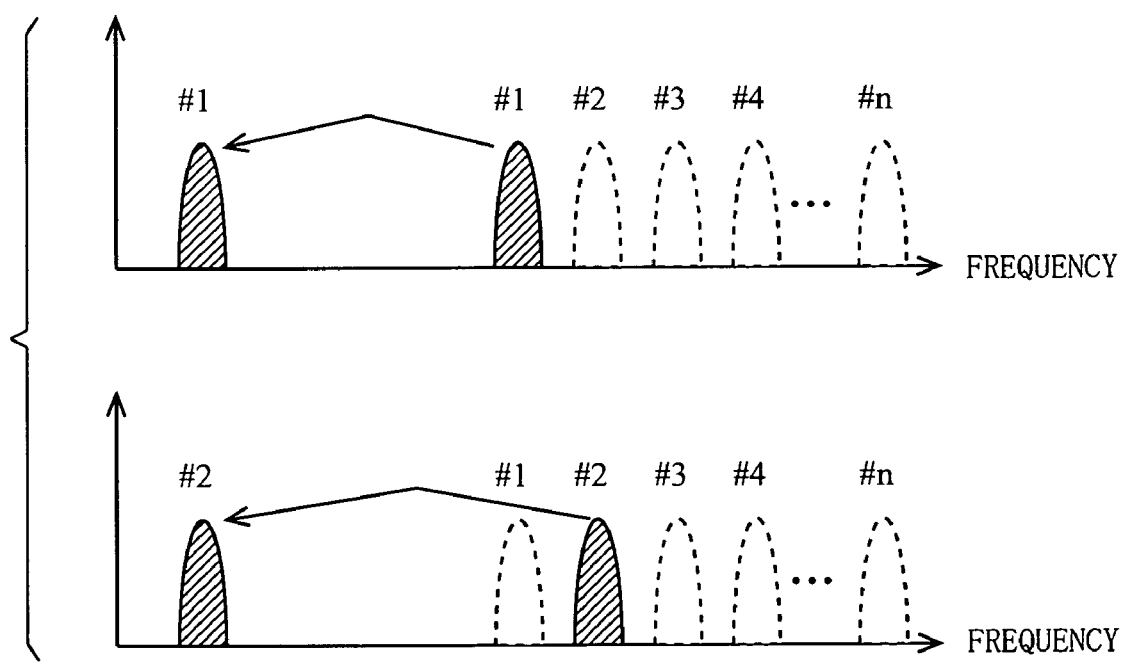

FIGS. 2A and 2B are spectrums for explaining a frequency conversion method according to the first embodiment. FIG. 2A illustrates examples of frequency conversion by the first and second modulating units $102_{-1}$ and $102_{-2}$. Although not described in conjunction with FIG. 2A, frequency conversion is performed in a k'th modulating unit $102_{-k}$ and a k'th frequency inverse-converting section $110_{-k}$ pursuant to a frequency conversion method used in the first modulating unit $102_{-1}$ and the first frequency inverse converting section $110_{-1}$. In FIGS. 2A and 2B, a frequency-converted modulated signal corresponding to the first demodulating section $112_{-1}$ (associated with a first subscriber) is indicated by #1. Similarly, frequency-converted demodulated signals corresponding to the second to n'th demodulating sections $112_{-2}$ to $112_{-n}$ are respectively indicated by #2 to #n. As can be seen from FIG. 2A, a frequency converting section of each of the first to n'th modulating units $102_{-1}$ to $102_{-n}$ performs frequency conversion on an incoming data signal so as to have a frequency band which is different from frequency bands of other data signals on which frequency conversion is performed by corresponding modulating units. In other words, frequency bands of the first to n'th frequency-converted modulated signals are different from each other.

FIG. 2B illustrates examples of frequency conversion by the first and second frequency inverse converting sections $110_{-1}$ and $110_{-2}$. As can be seen from FIG. 2B, the first to n'th frequency inverse converting sections $110_{-1}$ to $110_{-n}$ perform frequency conversion on input signal having mutually different frequency bands such that the mutually different frequency bands are converted back into an original frequency band (i.e., the frequency band before the frequency conversion performed by the frequency converting sections).

Referring to FIG. 1, each of the first to n'th frequency-converted modulated signals is inputted to a corresponding one of the first to n'th gain adjusting sections $115_{-1}$ to $115_{-n}$. Note that each of the first to n'th gain adjusting sections $115_{-1}$ to $115_{-n}$ is provided so as to be associated with a corresponding one of the first to n'th modulating units $102_{-1}$ to $102_{-n}$. The first gain adjusting section $115_{-1}$ adjusts the first frequency-converted modulated signal so as to have a prescribed signal level, and outputs a resultant signal. Note that information indicating the prescribed signal level is inputted from the gain control section 118 to the first gain adjusting section $115_{-1}$. The prescribed signal level is determined by the communication status observing section 116. The details of setting of signal levels will be described later. Note that an operation of each of the second to n'th gain control sections $115_{-2}$ to $115_{-n}$ is the same as that of the first gain control section $115_{-1}$.

The frequency multiplexing section 105 frequency-multiplexes the first to n'th frequency-converted modulated signals respectively outputted by the first to n'th gain adjusting sections $115_{-1}$ to $115_{-n}$. Herein, a signal obtained by frequency-multiplexing a frequency-converted modulated signals is referred to as the "frequency-multiplexed signal". The electrical-to-optical converting section 106 converts the frequency-multiplexed signal into an optical modulated signal, and outputs the optical modulated signal. The optical transmission path 107 carries the optical modulated signal, which is outputted by the electrical-to-optical converting section 106, to the receiving device 2. For example, the electrical-to-optical converting section 106 includes a semiconductor laser diode as a light source, and generates an optical modulated signal in accordance with a direct modulation scheme in which an injection current is modulated with a frequency-multiplexed signal to output the optical modulated signal. Signal levels of the first to n'th frequency-converted modulated signals forming a frequency-modulated signal are preset by the communication status observing section 116 so as not to generate clipping distortion in the semiconductor laser diode.

The communication status observing section 116 estimates the amount of data contained in each data signal (each of first to n'th data signals) to be transmitted to the terminal devices $3_{-1}$ to $3_{-n}$. Then, the communication status observing section 116 changes modulation parameters such that a terminal device to which a large amount of data is estimated to be transmitted can receive data at a higher speed than a terminal device to which a small amount of data is estimated to be transmitted. The term "modulation parameter" as described herein refers to a parameter having an influence on the amount of information of a data signal contained in a modulated signal or an influence on signal quality of the modulated signal.

In the first embodiment, the communication status observing section 116 detects the amount of data for each of the first to n'th data signals, and then sets modulation parameters based on each of the detected amount of data. Specifically, as the modulation parameters, the communication status observing section 116 sets values of constellation level for modulating the first to n'th data signals, and signal levels of modulated signals (frequency-converted modulated signals) modulated with respective data signals. The communication status observing section 116 outputs constellation level information to the modulation control section 117. The term "constellation level information" as described herein refers to information indicating n constellation levels for modulating the first to n'th data signals. The communication status observing section 116 outputs signal level information to the gain control section 118. The term "signal level information" as described herein refers to information indicating n signal level values to be set for the first to n'th data signals.

The modulation control section 117 sets a constellation level used in a basic modulating section of each of the first to n'th modulating units $102_{-1}$ to $102_{-n}$ based on the constellation level information outputted by the communication status observing section 116. The gain control section 118 sets signal level values to be adjusted in the first to n'th gain adjusting sections $115_{-1}$ to $115_{-n}$ based on the signal level information outputted by the communication status observing section 116.

Described next are operations of the receiving device 2, the first to n'th subscriber lines $111_{-1}$ to $111_{-n}$, and the first to n'th demodulating sections $112_{-1}$ to $112_{-n}$. The optical-to-electrical converting section 108 reconverts optical modulated signals transmitted via the optical transmission path 107 into a frequency-multiplexed signal. The frequency demultiplexing section 109 separates the frequency-multiplexed signal outputted by the optical-to-electrical converting section 108 into first to n'th frequency-converted modulated signals, and outputs the first to n'th frequency-converted modulated signals.

Each of the first to n'th frequency inverse converting sections $110_{-1}$ to $110_{-n}$ are provided so as to be associated with a corresponding one of the first to n'th frequency-converted modulated signals outputted by the frequency separating section 109. Each of the frequency inverse converting sections $110_{-1}$ to $110_{-n}$ converts a corresponding one of the first to n'th frequency-converted modulated signals so as to have a prescribed frequency band, and outputs resultant signals. Regarding a frequency inverse conversion method used in each of the frequency inverse converting sections $110_{-1}$ to $110_{-n}$, FIG. 2B illustrates examples of the first and second frequency inverse converting sections.

The first to n'th subscriber lines $111_{-1}$ to $111_{-n}$ are provided so as to be associated with the first to n'th frequency inverse converting sections $110_{-1}$ to $110_{-n}$. Each of the first to n'th subscriber lines $111_{-1}$ to $111_{-n}$ carries a corresponding one of signals obtained by inverse frequency conversion via the first to n'th frequency inverse converting sections $110_{-1}$ to $110_{-n}$. Each of the first to n'th demodulating sections $112_{-1}$ to $112_{-n}$ is connected to a corresponding one of the first to n'th subscriber lines $111_{-1}$ to $111_{-n}$, and demodulates a corresponding one of signals transmitted via the first to n'th subscriber lines $111_{-1}$ to $111_{-n}$. In the first embodiment, each of the demodulating sections $112_{-1}$ to $112_{-n}$ is an element included in, for example, a VDSL modem, and is able to demodulate data signals in accordance with a plurality of constellation levels. Further, each of the first to n'th demodulating sections $112_{-1}$ to $112_{-n}$ reproduces a demodulated data signal. As described above, a data signal is transmitted from the transmitting device 1 (the center station) to each of the first to n'th demodulating sections $112_{-1}$ to $112_{-n}$ (each subscriber's house).

Processing performed in the communication status observing section 116 will be described next. First, the outline of the processing is described. Here, a case where a means of QAM modulation based on constellation level M is used is described. The communication status observing section 116 classifies the first to n'th subscriber lines into first to P'th groups (where P is a natural number; 1<P<n). A different constellation level M is assigned to each group. Specifically, constellation levels are sequentially assigned from the first group in the order from the lowest to the highest. In general, a QAM modulator having a higher constellation level is able to provide higher-speed communication capability. For example, in the case where a modulation bandwidth, etc., are constant, a QAM modulator having M=256 is able to provide four times the communication capability of a QAM modulator having M=4. In the first embodiment, a low constellation level M is assigned to the first group, and therefore data transmission is conducted via relatively low-speed communication. On the other hand, a high constellation level is assigned to the P'th group, and therefore data transmission is conducted via relatively high-speed communication. In this manner, subscribers are classified into groups in accordance with communication statuses (the amount of packets to be transmitted), and a different constellation level is assigned to each group, thereby providing different communication capability for each group. Described below is an exemplary case where the classification into the first to P'th groups is conducted, a constellation level 4 is assigned to the first group, and a constellation level 256 is assigned to the P'th group.

The communication status observing section 116 outputs different prescribed level information corresponding to each of the first to P'th groups. The gain control section 118 sets prescribed optical modulation indices based on the prescribed level information corresponding to each group. Specifically, a higher optical modulation index (a higher signal level) is assigned to a group to which a high-speed communication capability should be provided, while a lower optical modulation index is assigned to a group to which a low-speed communication capability should be provided. Thus, it is possible to optimize the setting of optical modulation indices within the bounds of the total optical modulation index in accordance with communication statuses. The processing performed in the communication status observing section 116 is described in further detail below.

Figure 3:
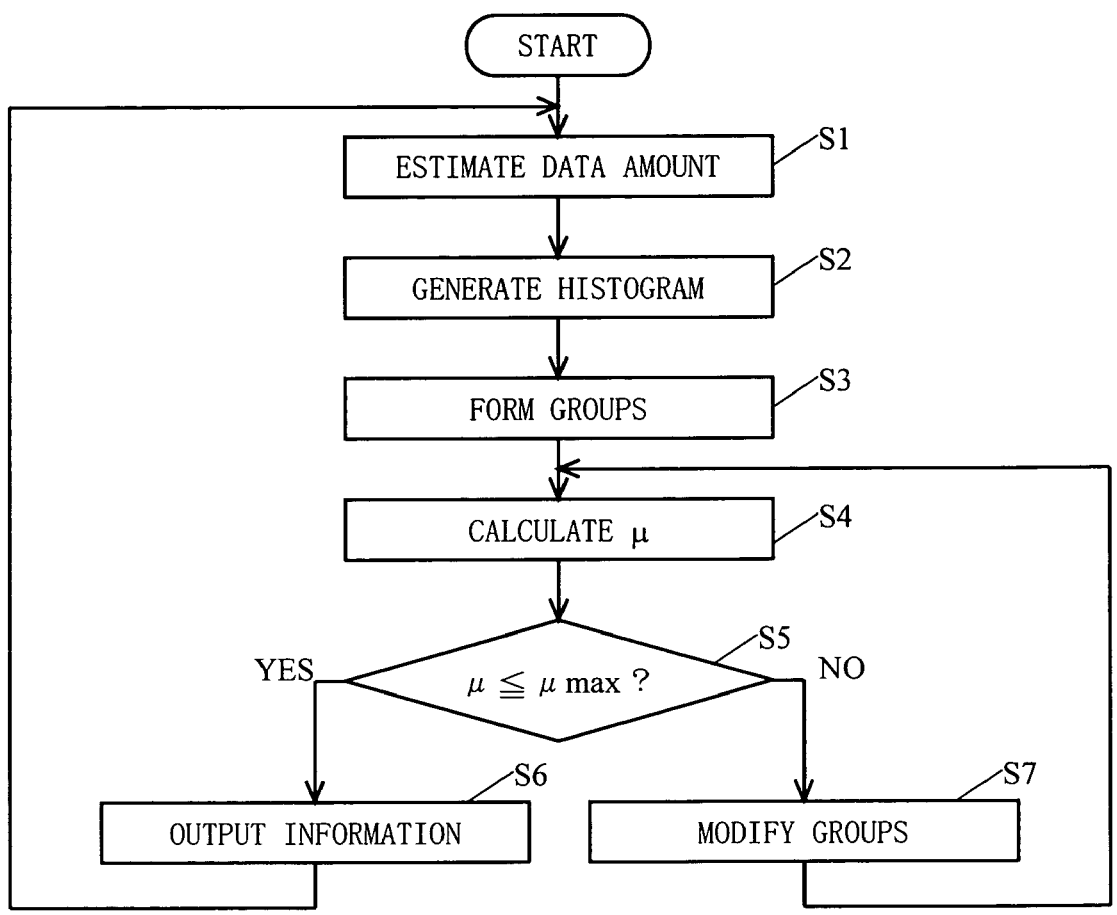
FIG. 3 is a flowchart illustrating the procedure of processing performed in a communication status observing section 116 illustrated in FIG. 1.

FIG. 3 is a flowchart illustrating the procedure of processing performed in the communication status observing section 116 illustrated in FIG. 1. The communication status observing section 116 is formed by a CPU, and a function of the communication observing section 116 is realized by a prescribed program allowing the CPU to implement the procedure illustrated in the flowchart of FIG. 3.

In FIG. 3, firstly, the communication status observing section 116 estimates the amount of data contained in each of first to n'th data signals outputted by the line separating section 101 (step S1). In the first embodiment, the communication status observing section 116 detects the amount of data for each of the first to n'th data signals. More specifically, the communication status observing section 116 detects the amount of packets as the amount of data for each data signal. Note that the process of step S1 is performed in a prescribed cycle T. Next, the communication status observing section 116 generates a histogram representing distribution of the number of subscriber lines with respect to the detected amount of packets (step S2). In this case, the number of subscriber lines corresponds to the number of data signals. Then, the communication status observing section 116 forms a plurality of groups based on the distribution represented by the histogram generated at step S2 (step S3). The process of each of steps S2 and S3 is described in further detail below.

FIG. 4 is a diagram illustrating an exemplary histogram generated in the communication status observing section 116 illustrated in FIG. 1. In FIG. 4, the horizontal axis indicates the amount of packets, and the vertical axis indicates the number of subscriber lines included in each division. At step S2 of FIG. 3, the communication status observing section 116 classifies the first to n'th subscriber lines into divisions (divisions by prescribed amounts of packets), and generates the histogram as illustrated in FIG. 4.

Then, the communication status observing section 116 uses the histogram to form P groups into which the first to n'th subscriber lines are divided (step S3 of FIG. 3). Specifically, assignment of divisions starts from a division (A shown in FIG. 4) corresponding to the smallest amounts of packets, such that the prescribed number of divisions (in FIG. 4, three divisions, i.e., divisions from A to C) are assigned to the first group. Assignment of divisions to the second group starts from a division (D shown in FIG. 4) corresponding to the smallest amounts of packets among divisions which are not assigned to any group, such that the prescribed number of divisions (in FIG. 4, three divisions, i.e., divisions from D to F) are assigned. For the third and subsequent groups, the communication status observing section 116 performs a process similar to that performed for each of the first and second groups, thereby forming P groups. Note that the prescribed number of divisions may be determined in any method. For example, the prescribed number of divisions may correspond to a value obtained by dividing the number of divisions in the histogram by the number P of groups. Specifically, in the case where the number of divisions in the histogram is ten and the number P of groups is five, the prescribed number of division is two. In such a case, a group formation process is performed such that two divisions are assigned to each group in the order starting from the smallest amount of packets.

The communication status observing section 116 forms groups such that each subscriber line is assigned to any one of the groups. In this manner, the communication status observing section 116 performs grouping such that subscriber lines corresponding to substantially the same amount of packets, i.e., substantially the same amount of data, belong in the same group. For description of grouping, a group number is assigned to each group in the order starting from the smallest amount of packets. In the case where a subscriber line belonging in the third division (indicated by C) from the left of FIG. 4 belongs in the second group, a subscriber line belonging in the fourth division (indicated by D) from the left never belongs in the first group. The group formation process is described in more detail below.

FIG. 5 illustrates a table used for a group formation process performed in the communication status observing section 116 illustrated in FIG. 1. The table illustrated in FIG. 5 is generated at the group formation process of step S3 illustrated in FIG. 3. In the first embodiment, subscriber numbers are used for grouping processing. A subscriber number is unique to each subscriber line. In FIG. 5, the first to n'th subscriber lines are sequentially numbered from 1 to n. In the group formation process, the communication status observing section 116 associates group number 1 with each subscriber number assigned to the first group, and also associates group number 2 with each subscriber number assigned to the second group. Regarding the third and subsequent groups, similar to the first and second groups, a group number for each group is associated with subscriber numbers assigned to that group.

When associating group numbers with subscriber numbers, the communication status observing section 116 also associates constellation levels and values of signal levels with the subscriber numbers. The association of the group numbers, the constellation levels and the values of signal levels is suitably determined based on the aftermentioned expression 1. Accordingly, the same constellation level and the same signal level are associated with subscriber numbers with which the same group number is associated. Note that values of the constellation levels are determined so as to increase with the group number. In the example shown in FIG. 5, constellation levels for subscriber lines belonging in the first, second, and third groups are determined as being 4, 16, and 32, respectively. The signal levels are previously determined based on the constellation levels, so as to satisfy the relationship which will be described in conjunction with FIG. 6. In FIG. 5, signal levels L1, L2, and L3 are associated with constellation levels 4, 16, and 32, respectively. The thus-generated table is stored in an internal memory of the communication status observing section 116. In the case where there is a table previously stored in the internal memory, the communication status observing section 116 updates that table to a newly generated table.

It is necessary to previously determine the constellation levels and the signal levels so as to satisfy conditions as described below. FIG. 6 is a graph illustrating relationships used in the first embodiment between required optical modulation indices and signal-to-noise ratios (SNRs). The term "required optical modulation index" as described herein refers to an optical modulation index corresponding to a required SNR. The term "required SNR" as described herein refers to an SNR required for transmitting a QAM modulated signal having a prescribed constellation level. In FIG. 6, $S_4$ indicates a required SNR when the constellation level used for QAM modulation is 4 (M=4). In this case, the signal level is determined such that an optical modulation index is equal to or more than a required optical modulation index $O_4$. Similarly, $S_{64}$ and $S_{256}$ indicate required SNRs corresponding to constellation levels 64 and 256, respectively. In such cases, signal levels are respectively determined so as to be equal to or more than $O_{64}$ (corresponding to $S_{64}$) and $O_{256}$ (corresponding to $S_{256}$). In this manner, the constellation levels and the signal levels are required to be determined such that the SNRs and optical modulation indices satisfy the relationships as illustrated in FIG. 6.

Referring to FIG. 3, following step S3, the communication status observing section 116 calculates a total optical modulation index μ (step S4). The index μ is obtained by the following expression, $$\mu = \left( \sum_P OMI_{M-QAM}^2 \cdot N_P \right)^{1/2} = (OM_4^2 \cdot N_1 + \ldots + OMI_{256}^2 \cdot N_p)^{1/2}, \quad (1)$$

where $OMI_4$ is an optical modulation index corresponding to a signal level for a constellation level 4. Similarly, $OMI_{256}$ is an optical modulation index corresponding to a signal level for a constellation level 256. These values of optical modulation indices can be previously determined based on signal levels. Each of $N_1$ to $N_P$ denotes the number of subscribed lines falling within a corresponding one of the first to P'th groups. In the above expression, a total optical modulation index can be calculated based on a signal level corresponding to each subscriber number. By previously setting a value of the signal level for each group, it is made possible to calculate the total optical modulation index by substituting $N_1$ to $N_P$ into the above expression. As in the case of the present embodiment, when the signal level is previously determined for each of the first to P'th groups, the total optical modulation index μ can be calculated using $N_1$ to $N_P$ as variables. On the contrary, when $N_1$ to $N_P$ are previously determined, the total optical modulation index μ can be calculated using signal levels as variables. Alternatively, both the signal levels and $N_1$ to $N_P$ may be modified simultaneously.

Next, the communication status observing section 116 determines whether the total optical modulation index μ calculated at step S4 is lower than or equal to a maximum value $\mu_{max}$ (step S5). The maximum value $\mu_{max}$ depends on a characteristic of the semiconductor laser diode included in the electrical-to-optical converting section 106. When it is determined at step S5 that the index μ is lower than or equal to the maximum value $\mu_{max}$, the process of step S6 is performed. That is, the communication status observing section 116 outputs constellation level information and signal level information in accordance with the table (FIG. 5) generated at step S3 (step S6). Specifically, information contained in the field of constellation level of the table stored in the internal memory is outputted as constellation level information to the modulation control section 117, and information contained in the field of signal level of the table is outputted as signal level information to the gain control section 118. After step S6, the procedure returns to step S1, and the communication status observing section 116 continues to perform processing. Note that the communication status observing section 116 performs the process of step S1 again after a lapse of time T from the last time step S1 is performed.

On the other hand, when it is determined at step S5 that the index μ is not lower than nor equal to the maximum value $\mu_{max}$, the process of step S7 is performed. That is, the communication status section 116 modifies present groups to form new groups (step S7). Specifically, a plurality of groups are formed using the histogram generated at step S2. The communication status observing section 116 modifies the currently stored table to store a new table, such that the new table has a group arrangement which is different from the current group arrangement. The modification of groups is preferably performed such that the total optical modulation index μ is reduced. After step S7, the procedure returns to step S4, and the communication status observing section 116 continues to perform processing.

Figure 7A:
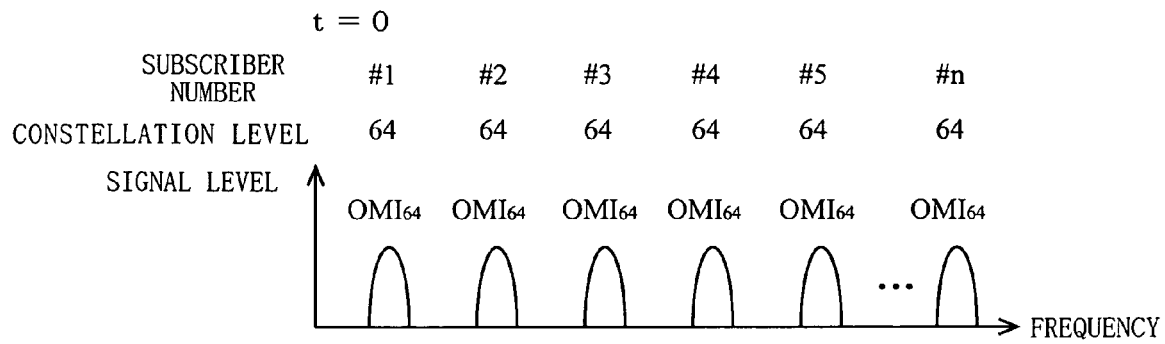
FIGS. 7A to 7C are spectrums each illustrating an example of dynamic variation of a constellation level and a signal level with respect to each frequency-converted modulated signal.
Figure 7B:
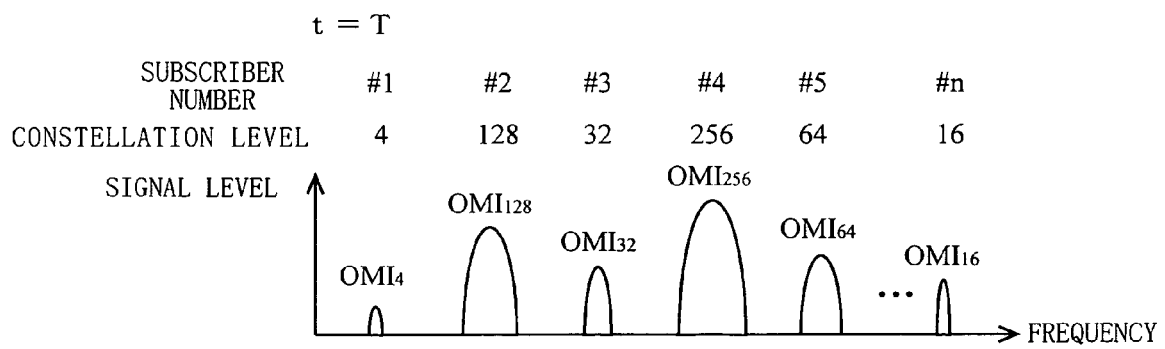
Figure 7C:
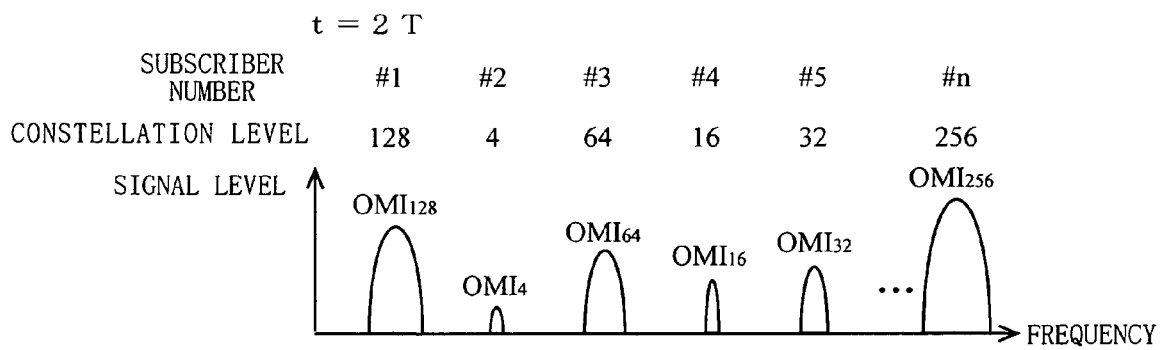

Described next is the dynamic variation of a constellation level and a signal level with respect to each frequency-converted modulated signal. FIGS. 7A to 7C are diagrams each illustrating an example of dynamic variation of the constellation level and the signal level with respect to each frequency-converted modulated signal. In FIGS. 7A to 7C, spectrums of first to n'th frequency-converted modulated signals are associated with constellation levels and subscriber numbers. Specifically, FIG. 7A illustrates a state of each frequency-converted modulated signal at a time point where time t=0; FIG. 7B illustrates a state of each frequency-converted modulated signal at a time point where time t=T; and FIG. 7C illustrates a state of each frequency-converted modulated signal at a time point where time t=2T. Here, T denotes a control cycle in which the communication status observing section 116 outputs an observation result. In other words, the cycle T corresponds to a cycle in which step S1 illustrated in FIG. 3 is performed. Note that the value of T is required to be equal to or more than the sum of time required for the modulation control section 117 to set a constellation level for each basic modulating section 103 and time required for the gain control section 118 to set a signal level in each of the first to n'th gain adjusting sections 115$_{-1}$ to 115$_{-n}$.

In FIG. 7A, at a time point where t=0, a constellation level (64) and a signal level (an optical modulation index) are equally set for all the frequency-converted modulated signals. This setting is default. Next, consider a case where after the lapse of a certain period of time from a time point where t=0, communication statuses are detected to show that the amount of desired packets becomes smaller in the order of #4, #2, #5, #3, #n, and #1. Here, #1 to #n represent subscriber numbers (although the frequency-converted modulated signals, which are described in conjunction with FIG. 2, are also represented by #1 to #n, the frequency-converted modulated signals correspond to the subscriber numbers, and therefore the same reference numerals are used for corresponding subscriber numbers). In the case considered here, as can be seen from FIG. 7B, constellation levels and signal levels are controlled in accordance with communication statuses. In the case where communication statuses detected after a further lapse of time show that the amount of desired packets becomes smaller in the order of #n, #1, #3, #5, #4, and #2, as can be seen from FIG. 7C, the constellation levels and the signal levels are changed in accordance with the communication statuses.

In the first embodiment, the transmission rate (the constellation level) of a data signal transmitted from the transmitting device 1 to each of the first to n'th terminal devices 3$_{-1}$ to 3$_{-n}$ is set in a variable manner. Accordingly, negotiation is performed between the transmitting device 1 and each of the terminal devices 3$_{-1}$ to 3$_{-n}$, so that the transmission rate is adjusted. A process for adjusting the transmission rate is performed each time a constellation level is changed in a basic modulating section. Specifically, when the constellation level is changed in the basic modulating section, the transmitting device 1 transmits information about the constellation level after change, before transmitting data obtained by modulation via changing the constellation level. Each of the first to n'th demodulating sections 112$_{-1}$ to 112$_{-n}$ performs demodulation based on the information about the constellation level after change which is transmitted from the transmitting device 1. In order to perform reliable communication via an optical transmission path, it is preferred that the negotiation and adjustment are performed using a low constellation level (e.g., 4 QAM). For such negotiation and adjustment, a known VDSL technology (a so-called hand-shaking technology) can be used.

As described above, by controlling a prescribed constellation level and a prescribed optical modulation index, which are assigned to each frequency-converted modulated signal, in accordance with a communication status at a subscriber end, it is made possible to provide an optimum communication quality, e.g., higher transmission quality can be provided to a subscriber group (e.g., the aforementioned P'th group) which requires the highest amount of data.

The first embodiment has been described with respect to an exemplary case where the receiving device 2 is provided in a common facility of a housing compound and the first to n'th terminal devices 3$_{-1}$ to 3$_{-n}$ are provided in subscribers' houses. However, the present invention is not limited to this. For example, a terminal device may be located at an access point of a wireless LAN, and a receiving device maybe provided in a commercial facility.

Further, although the first embodiment has been described with respect to an exemplary case where the modulation scheme of the basic modulating section 103 is M-ary QAM, the modulation scheme of the present invention is not limited to this. Any modulation scheme may be used as long as a communication speed and a communication quality can be adjusted by modulation parameters. For example, amplitude (AM) modulation as used in a vestigial side band (VSB) scheme may be employed. The basic modulating section may perform discrete multi-tone (DMT) modulation, in which modulation is performed by further dividing each data signal contained in a multiplexed signal into a plurality of subcarriers, or may perform an orthogonal frequency division multiplexing (OFDM) scheme as used in radio communication, etc. In these modulation schemes, constellation levels and signal levels can be used as modulation parameters. In the case of performing the DMT modulation or the OFDM modulation, the number of subcarriers may also be used as a modulation parameter. An example of other modulation schemes includes a code division multiple access (CDMA) scheme. In the CDMA scheme, a spreading factor and the number of sub-channels can be used as modulation parameters.

Second Embodiment

Figure 8:
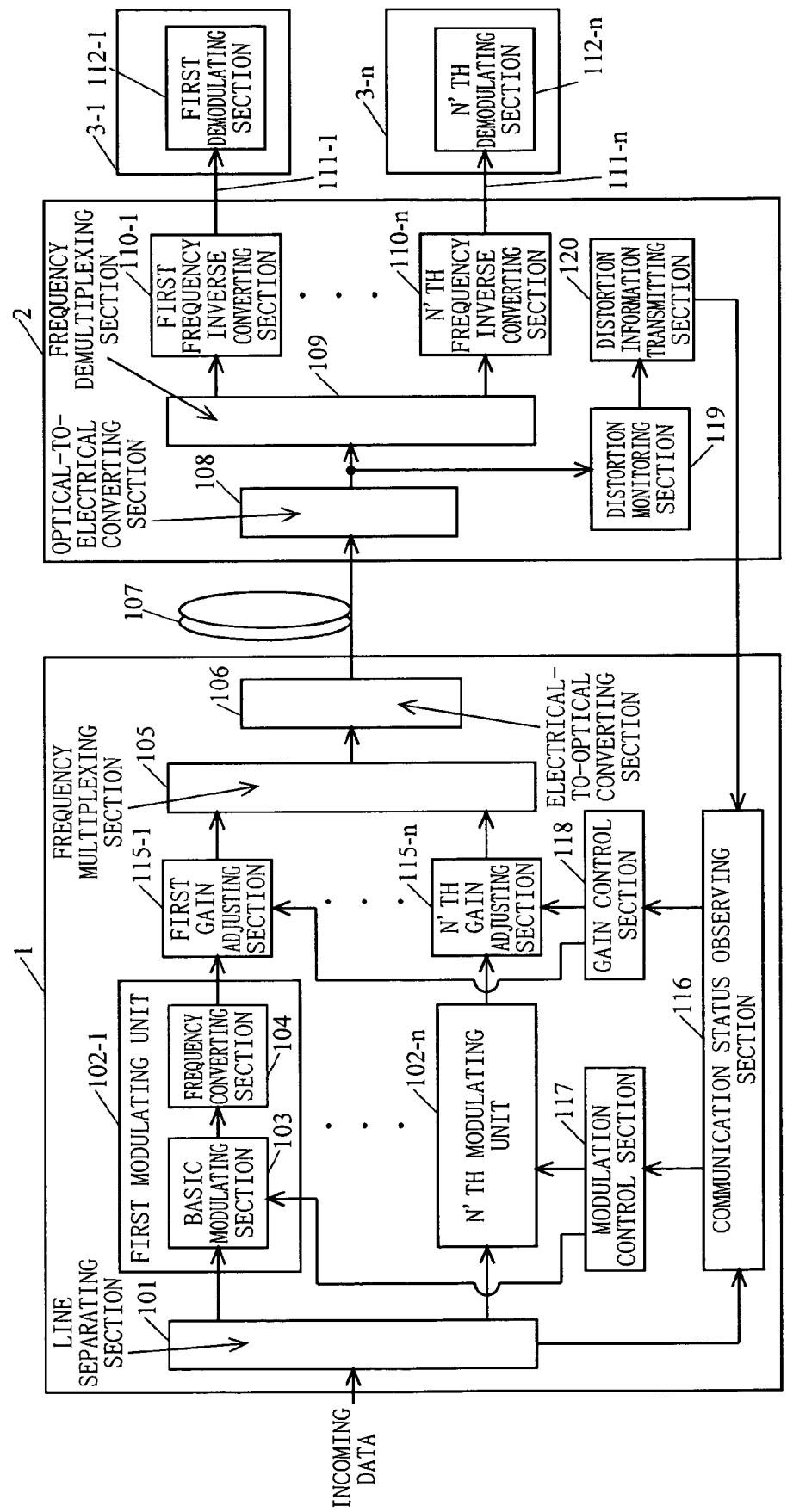
FIG. 8 is a block diagram illustrating a configuration of an optical transmission system according to the second embodiment.

An optical transmission system according to a second embodiment of the present invention will be described below. FIG. 8 is a block diagram illustrating a configuration of the optical transmission system according to the second embodiment. As illustrated in FIG. 8, the optical transmission system according to the second embodiment is configured by further adding a distortion monitoring section 119 and a distortion information transmitting section 120 to the receiving device 2 of the optical transmission system according to the first embodiment illustrated in FIG. 1. Accordingly, in FIG. 8, elements similar to those illustrated in FIG. 1 are denoted by similar reference numerals, and description thereof is omitted.

Described below are operations of the distortion monitoring section 119 and the distortion information transmitting section 120, which are provided in the receiving device 2. In the receiving device 2, the distortion monitoring section 119 detects a distortion level at a prescribed frequency from a frequency-multiplexed signal outputted by the optical-to-electrical converting section 108. Alternatively, the distortion monitoring section 119 may be configured so as to detect a distortion level from an output of the frequency separating section 109. A specific example of distortion level detection will be described below with reference to FIGS. 9A and 9B.

Figure 9A:
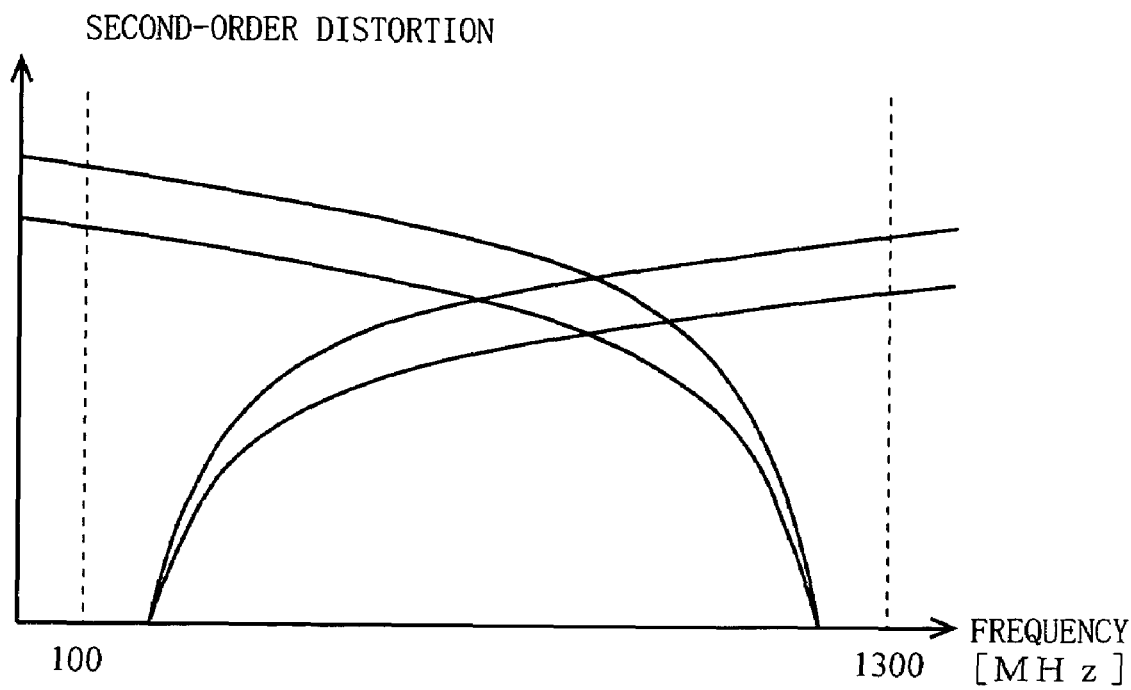
FIGS. 9A and 9B are graphs respectively illustrating an exemplary second-order distortion and an exemplary third-order distortion which are detected by a distortion monitoring section 119 illustrated in FIG. 8.
Figure 9B:
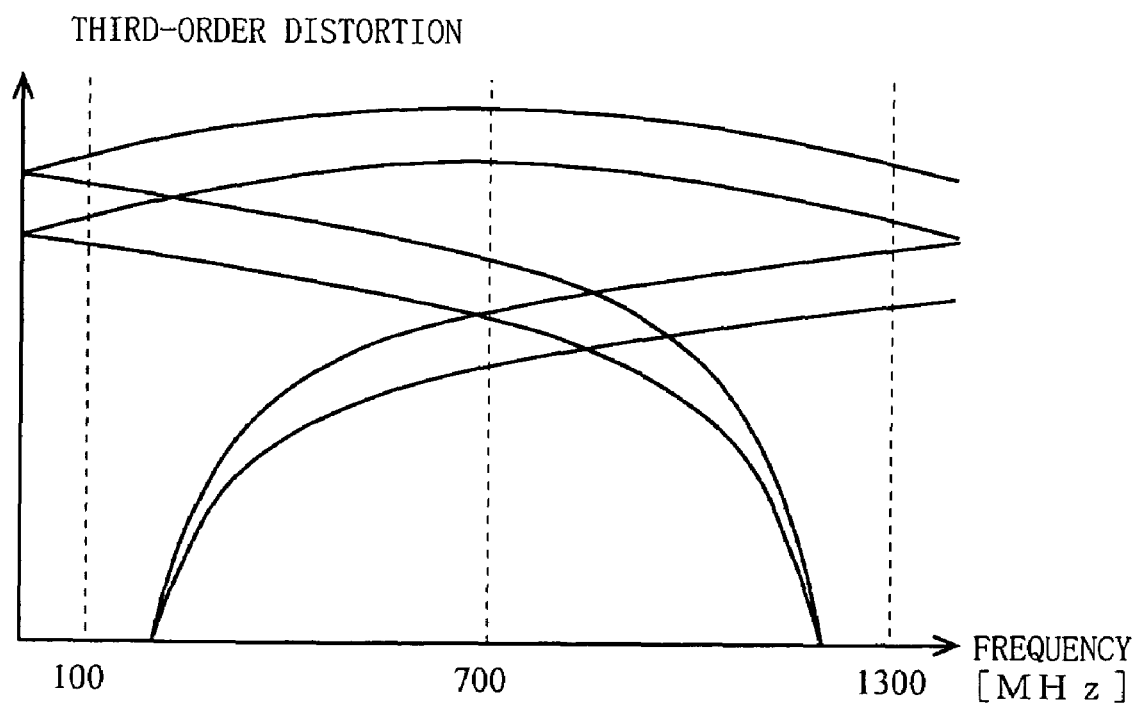

FIGS. 9A and 9B are graphs respectively illustrating an exemplary second-order distortion and an exemplary third-order distortion which are detected by the distortion monitoring section 119 illustrated in FIG. 8. FIG. 9A illustrates a frequency characteristic of a second-order distortion. FIG. 9B illustrates a frequency characteristic of a third-order distortion. The graphs of FIGS. 9A and 9B are illustrated with respect to an exemplary case where frequency-converted modulated signals are allocated within a frequency range between 100 MHz and 1300 MHz. As illustrated in FIG. 9A, a distortion level of the second-order distortion is at its highest at the minimum and maximum frequencies in a frequency band in which the frequencies of the frequency-converted modulated signals are arranged. Accordingly, regarding the influence of the second-order distortion, a maximum value of distortion can be detected by measuring a distortion level in the vicinity of each of the lowest frequency and the highest frequency in the frequency band in which the frequencies of the frequency-converted modulated signals are arranged. For example, in FIG. 9A, the maximum value of the second-order distortion can be detected by measuring a distortion level in the vicinity of each of the lowest frequency (100 MHz) and the highest frequency (1300 MHz). As can be seen from FIG. 9B, a distortion level of the third-order distortion becomes the highest in the vicinity of the center of the frequency band in which the frequencies of the frequency-converted modulated signals are arranged. Accordingly, regarding the influence of the third-order distortion, a maximum value of distortion can be detected by measuring a distortion level of the center frequency in the frequency band in which the frequencies of the frequency-converted modulated signals are assigned. For example, in FIG. 9B, the maximum value of the third-order distortion can be detected by measuring a distortion level in the vicinity of the center frequency (700 MHz).

Referring to FIG. 8, the distortion monitoring section 119 outputs to the distortion information transmitting section 120 distortion level information indicating a value of a detected distortion level. The distortion information transmitting section 120 transmits the distortion level information to the communication status observing section 116 via a transmission path provided for bi-directional communication. The transmission path from the receiving device 2 to the transmitting device 1 may be configured in any mode. For example, optical transmission or electric transmission may be employed. The communication status observing section 116 refers to the distortion level information transmitted by the distortion information transmitting section 120, and then outputs constellation level information and signal level information. An operation of the communication status observing section 116 according to the second embodiment will be described in detail below.

Figure 10:
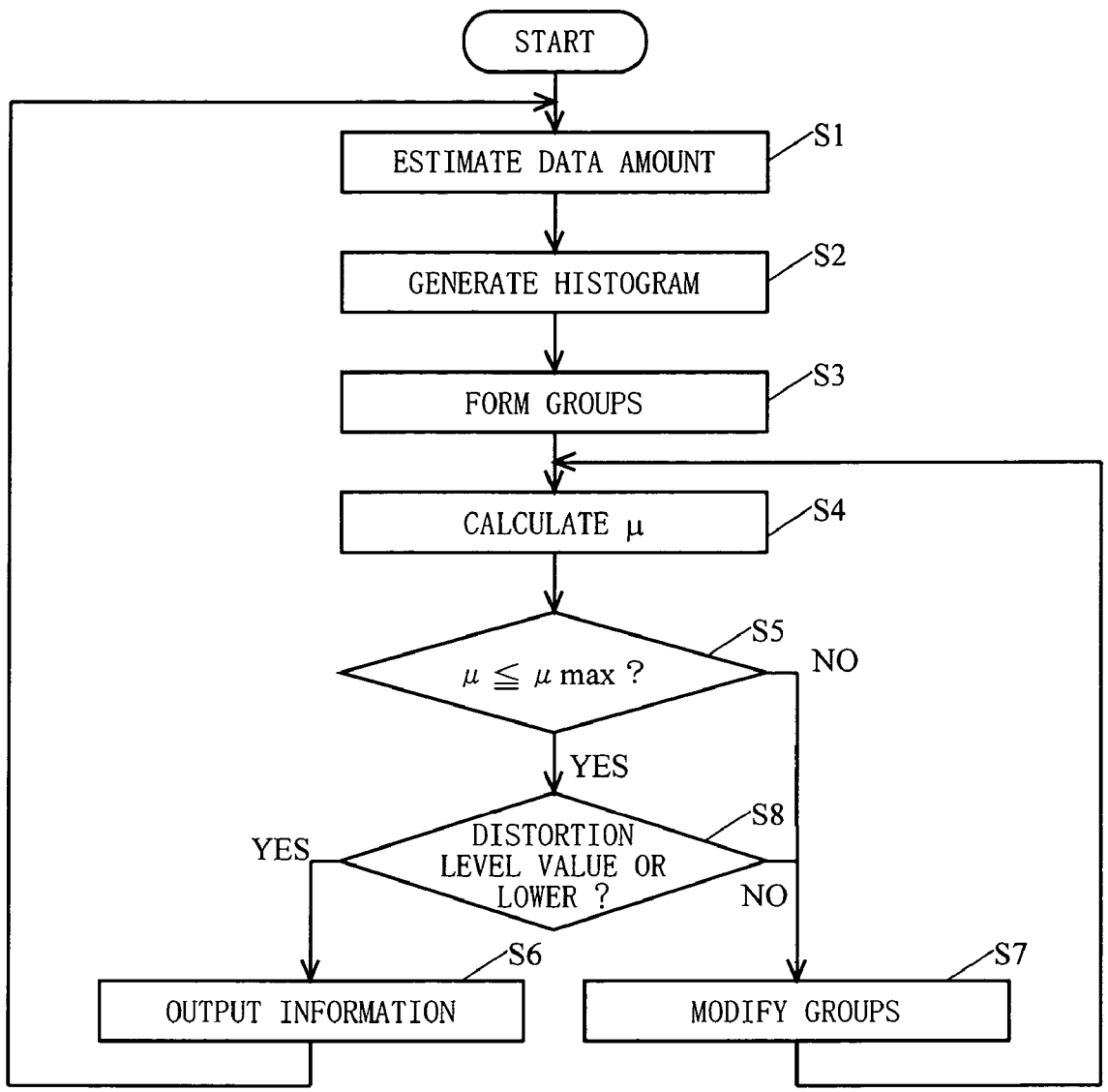
FIG. 10 is a flowchart illustrating the procedure of processing performed in a communication status observing section 116 according to the second embodiment.

FIG. 10 is a flowchart illustrating the procedure of processing performed in the communication status observing section 116 according to the second embodiment. Steps S1 to S4 shown in FIG. 10 are similar to steps S1 to S4, respectively, shown in FIG. 3, and therefore description thereof is omitted. In the second embodiment, when it is determined at step S5 shown in FIG. 10 that the total optical modulation index μ is lower than or equal to a maximum value $\mu_{max}$, the procedure proceeds to step S8. Then, the communication status observing section 116 determines whether the level of distortion in a frequency-multiplexed signal outputted by the optical-to-electrical converting section 108 of the receiving device 2 is lower than or equal to a required distortion level (step S8). Specifically, the communication status observing section 116 determines whether the level of distortion indicated by the distortion level information transmitted by the distortion information transmitting section 120 of the receiving device 2 is lower than or equal to a required distortion level value. Note that the required distortion level value is previously determined by the communication status observing section 116.

When it is determined at step S8 that the amount of distortion is more than the required distortion level value, the communication status observing section 116 performs the process of step S7. Specifically, in the second embodiment, even in the case where it is determined at step S5 that the total optical modulation index μ is lower than or equal to a maximum value $\mu_{max}$, when the distortion level is more than the required distortion level value, the procedure proceeds to step S7, where groups are modified. On the other hand, when a required signal quality is satisfied, i.e., the amount of distortion is lower than or equal to the required distortion level value, the communication status observing section 116 performs the process of step S6.

Thus, according to the second embodiment, it is possible to determine a constellation level and a signal level in consideration of the influence of distortion on the receiving device 2. Moreover, in the frequency band where frequencies of a plurality of frequency-converted modulated signals are arranged, only a specific frequency, which is most susceptible to the influence of distortion, is selected for monitoring, and therefore the influence of distortion can be detected without measuring distortion levels in the entire frequency band.

Third Embodiment

Figure 11:
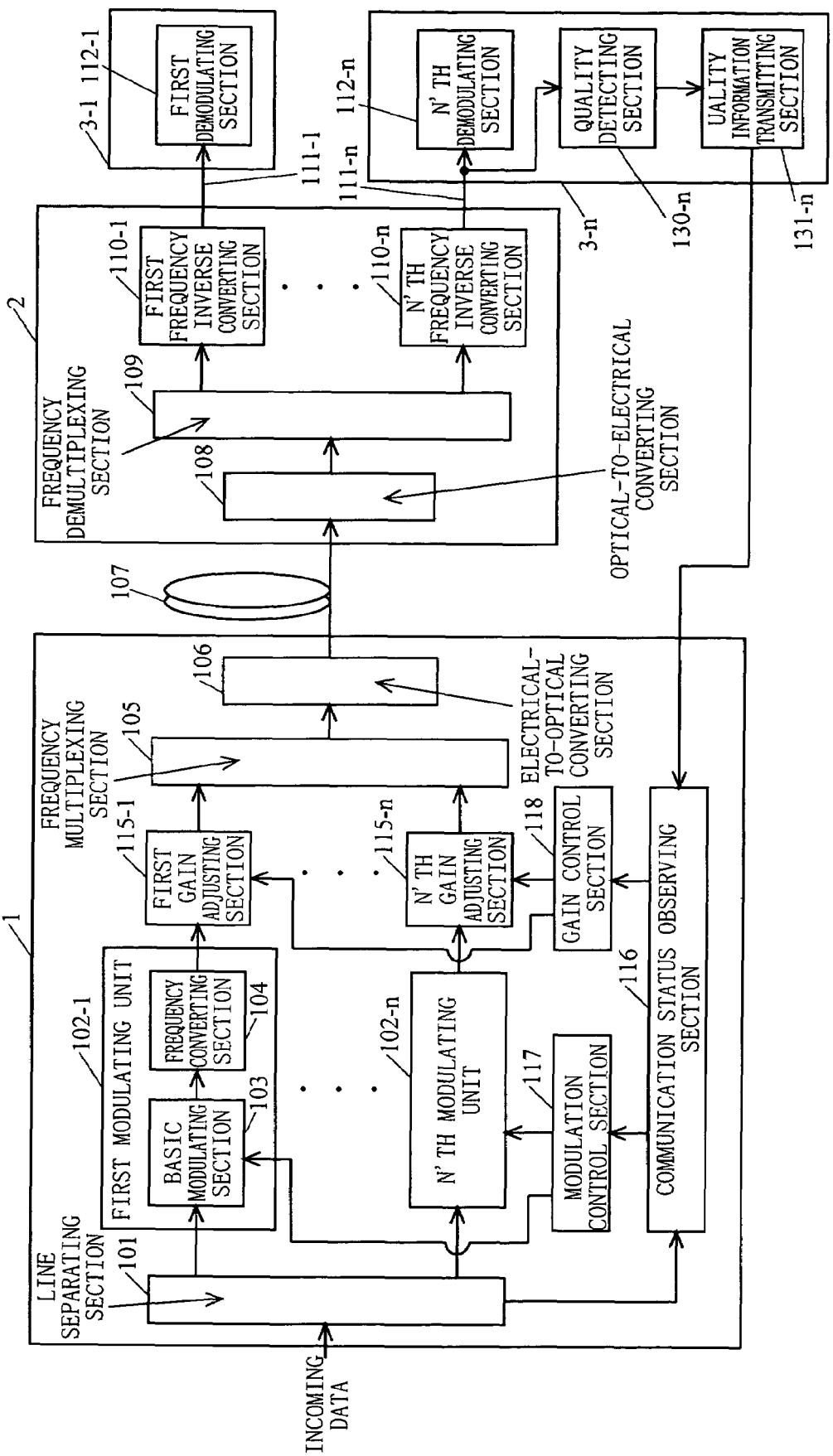
FIG. 11 is a block diagram illustrating a configuration of an optical transmission system according to the third embodiment.
Figure 13:
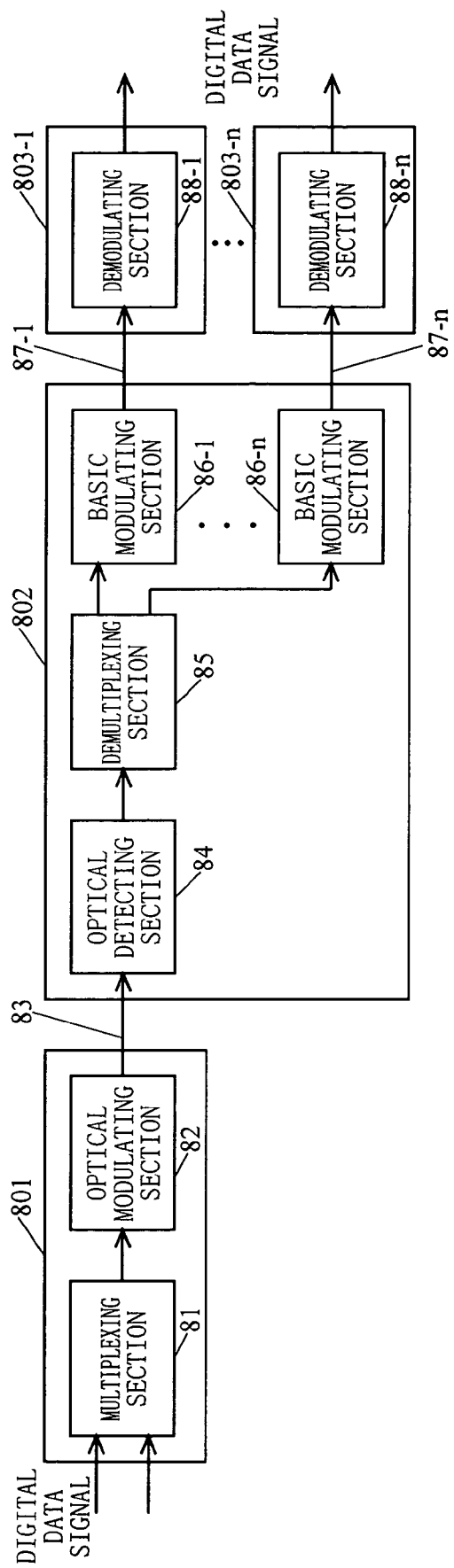
FIG. 13 is a block diagram illustrating a configuration of a conventional optical transmission system.

An optical transmission system according to a third embodiment of the present invention will be described below. FIG. 11 is a block diagram illustrating a configuration of the optical transmission system according to the third embodiment. As illustrated in FIG. 11, the optical transmission system according to the third embodiment is configured by further adding a quality detecting section and a quality information transmitting section to each terminal device of the optical transmission system according to the first embodiment illustrated in FIG. 1. Accordingly, in FIG. 11, elements similar to those illustrated in FIG. 1 are denoted by similar reference numerals, and description thereof is omitted. Although the first to n'th terminal devices $3_{-1}$ to $3_{-n}$ include equivalent quality detecting sections and equivalent quality information transmitting sections, only a quality detecting section $130_{-n}$ and a quality information transmitting section $131_{-n}$ are shown in FIG. 11.

Operations of a n'th quality detecting section $130_{-n}$ and a n'th quality information transmitting section $131_{-n}$ provided in the n'th terminal device 3-n are described below as examples of a quality detecting section and a quality information transmitting section provided in each of the first to n'th terminal devices $3_{-1}$ to $3_{-n}$. The quality detecting section $130_{-n}$ monitors the signal quality of a modulated signal transmitted by the subscriber line $111_{-n}$ connected to the n'th terminal device $3_{-n}$. Specifically, the quality detecting section 130-n detects an SNR and/or a bit error ratio as the signal quality. The quality detecting section $130_{-n}$ outputs to the quality information transmitting section $131_{-n}$ signal quality information indicating the signal quality of the modulated signal. The quality information transmitting section $131_{-n}$ transmits the signal quality information to the communication status observing section 116 via a transmission path provided for bi-directional communication. The transmission path from each of the first to n'th terminal devices $3_{-1}$ to $3_{-n}$ to the transmitting device 1 may be configured in any mode. For example, optical transmission or electric transmission may be employed. For monitoring signal quality and transmitting signal quality information in a manner as described above, a PHY status monitoring function of a standard VDSL technology can be used. The communication status observing section 116 refers to the signal quality information transmitted by the signal quality transmitting section $131_{-n}$, and then outputs constellation level information and signal level information. An operation of the communication status observing section 116 according to the third embodiment will be described in detail below.

FIG. 12 is a flowchart illustrating the procedure of processing performed in the communication status observing section 116 according to the third embodiment. Steps S1 to S4 shown in FIG. 12 are similar to steps S1 to S4, respectively, shown in FIG. 3, and therefore detailed description thereof is omitted. In the third embodiment, if it is determined at step S5 shown in FIG. 12 that the total optical modulation index μ is lower than or equal to a maximum value $μ_{max}$, the procedure proceeds to step S9. Then, the communication status observing section 116 determines whether signal quality in each of the first to n'th terminal devices $3_{-1}$ to $3_{-n}$ satisfies a prescribed criterion (step S9). Specifically, the communication status observing section 116 determines whether signal quality indicated by signal quality information transmitted by a quality information transmitting section of each of the first to n'th terminal devices $3_{-1}$ to $3_{-n}$ satisfies required signal quality. Note that the required signal quality is previously determined by the communication status observing section 116.

When it is determined at step S9 that the signal quality indicated by the signal quality information does not satisfy the required signal quality, the communication status observing section 116 performs the process of step S7. Specifically, in the third embodiment, when any one of the first to n'th terminal devices $3_{-1}$ to $3_{-n}$ does not satisfy the required signal quality, modification of groups is performed. On the other hand, when the required signal quality is satisfied, the communication status observing section 116 performs the process of step S6.

As described above, according to the third embodiment, it is possible to determine constellation levels and signal levels with reference to a signal quality in each terminal device. Moreover, standard VDSL technology can be used for monitoring signal quality and transmitting signal quality information, thereby facilitating easy monitoring of signal quality and easy transmission of signal quality information.

In the above-described embodiments, the communication status observing section 116 estimates the amount of data contained in each of the first to n'th data signal by directly detecting the amounts of data. In other embodiments, the amounts of data may be estimated using information about each terminal device (terminal information) with respect to the use of each communication line (each subscriber line). Specifically, service time may be used as the terminal information. The term "service time" as described herein refers to predetermined information about a certain time period in which a specific terminal device uses a communication line. For example, the service information indicates a high-use time period (e.g., from 20:00 to 23:00, or in the daytime). The communication status observing section 116 refers to the current time and the service time. If the current time falls within a period of the service time, the communication status observing section 116 estimates that a large amount of data is transmitted. On the contrary, if the current time is out of the period of the service time, the communication status observing section 116 estimates that a small amount of data is transmitted. In this example, modulation parameters are separately set for two classified groups, i.e., a group for a large amount of data and a group for a small amount of data.

The above-described terminal information may indicate the type of the user who uses the terminal device. For example, the terminal information indicates whether the user is a personal user or a corporate user. It is assumed that the communication status observing section 116 estimates that personal users often use communication lines in the nighttime, while corporate users often use communication lines in the daytime. Specifically, the communication status observing section 116 refers to the current time and the terminal information. If the current time fall within a period of the daytime, the communication status observing section estimates that a large amount of data is transmitted to the personal users' terminal devices, and a small amount of data is transmitted to the corporate users' terminal devices.

The information, which indicates whether the user is a personal user or a corporate user, is predetermined and held in the communication status observing section 116. Alternatively, the communication status observing section 116 may determine whether the user is a personal user or a corporate user in accordance with the type of transmitted data. In the case where the communication status observing section 116 reads data transmitted to a terminal device, and identifies that the most of the transmitted data is, for example, game content, the communication status observing section 116 determines that the user of the terminal device to which the data is transmitted is a personal user. In the case where the most of the transmitted data is business document content, the communication status observing section 116 determines that the user of the terminal device to which the data is transmitted is a corporate user. It is conceivable that the terminal information also indicates a charge for use of a communication line or duration of use (a time period during which the communication line is continuously used). Specifically, the user whose charge for use is high is considered as having transmitted a large amount of data. Also, the user whose duration of use is long is considered as having transmitted a large amount of data. Note that even when it is estimated that a user has transmitted a large amount of data, the communication status observing section 116 is not required to set modulation parameters such that the user can transmit a large amount of data. For example, the user whose duration of use is long may set modulation parameter so as to reduce the amount of data to be transmitted.

While the invention has been described in detail, the foregoing description is in all aspects illustrative and not restrictive. It is understood that numerous other modifications and variations can be devised without departing from the scope of the invention.

What is claimed is:

1. An optical transmitting device for transmitting an optical signal via an optical transmission path to a receiving device connected via prescribed communication lines to first to n'th terminal devices (where n is an integer of 2 or more), the optical transmitting device comprising:
   a modulating section for generating first to n'th modulated signals based on first to n'th data signals to be transmitted to the first to n'th terminal devices, respectively, the first to n'th modulated signals being obtained by modulation with individual modulation parameters;
   an optical transmitting section for converting the first to n'th modulated signals generated by the modulating section into an optical signal and for transmitting the optical signal to the receiving device via the optical transmission path;
   a data amount estimating section for estimating an amount of data for each of the first to n'th data signals; and
   a parameter control section for setting the individual modulation parameters used in the modulating section based on amounts of data for the first to n'th data signals estimated by the data amount estimating section,
   wherein the data amount estimating section previously holds information about each of the first to n'th terminal devices with respect to use of a corresponding one of the prescribed communication lines, and estimates the amount of data for each of the first to n'th data signals based on the information and a current time.

2. An optical transmitting device for transmitting an optical signal via an optical transmission path to a receiving device connected via prescribed communication lines to first to n'th terminal devices (where n is an integer of 2 or more), the optical transmitting device comprising:
- a modulating section for generating first to n'th modulated signals based on first to n'th data signals to be transmitted to the first to n'th terminal devices, respectively, the first to n'th modulated signals being obtained by modulation wit individual modulation parameters;
- an optical transmitting section for converting the first to n'th modulated signals generated by the modulating section into an optical signal and for transmitting the optical signal to the receiving device via the optical transmission path;
- a data amount estimating section for estimating an amount of data for each of the first to n'th data signals; and
- a parameter control section for setting the individual modulation parameters used in the modulating section based on amounts of data for the first to n'th data signals estimated by the data amount estimating section,
- wherein the parameter control section comprises:
  - a group classifying section for classifying the first to n'th data signals into a plurality of groups in accordance with the amount of data estimated for each of the first to n'th data signals by the data amount estimating section; and
  - a parameter setting section for setting modulation parameters at the same value for each of data signals classified into the same group by the group classifying section.

3. The optical transmitting device according to claim 2, wherein:
- the parameter control section further includes a histogram generating section for generating, based on amounts of data estimated by the data amount estimating section, a histogram in which the amounts of data are divided into prescribed units of divisions; and
- the group classifying section is operable to use the histogram generated by the histogram generating section to form the plurality of groups.

4. An optical transmitting device for transmitting an optical signal via an optical transmission path to a receiving device connected via prescribed communication lines to first to n'th terminal devices (where n is an integer of 2 or more), the optical transmitting device comprising:
- a modulating section for generating first to n'th modulated signals based on first to n'th data signals to be transmitted to the first to n'th terminal devices, respectively, the first to n'th modulated signals being obtained by modulation with individual modulation parameters;
- an optical transmitting section for converting the first to n'th modulated signals generated by the modulating section into an optical signal and for transmitting the optical signal to the receiving device via the optical transmission path;
- a data amount estimating section for estimating an amount of data for each of the first to n'th data signals; and
- a parameter control section for setting the individual modulation parameters used in the modulating section based on amounts of data for the first to n'th data signals estimated by the data amount estimating section,
- wherein the parameter control section is operable to set the individual modulation parameters so as to have values within a range such that the first to n'th modulated signals satisfy a condition concerning a transmission quality in the optical transmission path, and wherein the parameter control section further includes:
- a condition determination section for determining, based on the individual modulation parameters, whether the first to n'th modulated signals satisfy the condition concerning the transmission quality in the optical transmission path; and
- a modifying section for modifying the individual modulation parameters when the condition determination section determines that the condition is not satisfied.

5. The optical transmitting device according to claim 4, wherein the condition is such that a total mean square root optical modulation index, which is determined based on the individual modulation parameters of the first to n'th modulated signals, is lower than or equal to a prescribed value.

6. An optical transmitting device for transmitting an optical signal via an optical transmission path to a receiving device connected via prescribed communication lines to first to n'th terminal devices (where n is an integer of 2 or more), the optical transmitting device comprising:
- a modulating section for generating first to n'th modulated signals based on first to n'th data signals to be transmitted to the first to n'th terminal devices, respectively, the first to n'th modulated signals being obtained by modulation with individual modulation parameters;
- an optical transmitting section for converting the first to n'th modulated signals generated by the modulating section into an optical signal and for transmitting the optical signal to the receiving device via the optical transmission path;
- a data amount estimating section for estimating an amount of data for each of the first to n'th data signals; and
- a parameter control section for setting the individual modulation parameters used in the modulating section based on amounts of data for the first to n'th data signals estimated by the data amount estimating section,
- wherein the individual modulation parameters include the number of subcarriers used for performing discrete multi-tone modulation on each of the first to n'th data signals.

7. An optical transmission system comprising:
- a transmitting device for transmitting a signal via an optical transmission path;
- a receiving device fox receiving the signal transmitted via the optical transmission path; and
- first to n'th (where n is an integer of 2 or more) terminal devices connected via respective prescribed communication lines to the receiving device,
- wherein the transmitting device comprises:
  - a modulating section for generating first to n'th modulated signals based on first to n'th data signals to be transmitted to the first to n'th terminal devices, respectively, the first to n'th modulated signals being obtained by modulation with individual modulation parameters;
  - an optical transmitting section for converting the first to n'th modulated signals generated by the modulating section into an optical signal and for transmitting the optical signal to the receiving device via the optical transmission path;
  - a data amount estimating section for estimating an amount of data for each of the first to n'th data signals; and
  - a parameter control section for setting the individual modulation parameters used in the modulating section based on amounts of data for the first to n'th data signals estimated by the data amount estimating section, wherein the receiving device includes:
an optical receiving section for receiving the optical signal transmitted via the optical transmission path and for converting the optical signal into an electric signal; and
an electric transmitting section for transmitting the first to n'th modulated signals contained in the electric signal, which is obtained by conversion via the optical receiving section, to the first to n'th terminals to which the first to n'th modulated signals should be transmitted via the prescribed communication lines, wherein each of first to n'th terminal devices includes a demodulating section for demodulating a modulated signal transmitted via a corresponding one of the prescribed communication lines, and wherein the data amount estimating section previously holds information about each of the first to n'th terminal devices with respect to use of a corresponding one of the prescribed communication lines, and is operable to estimate the amount of data for each of the first to n'th data signals based on the information and a current time.

8. The optical transmission system according to claim 7, further comprising a first transmission path connected between the receiving device and the transmitting device,
wherein the receiving device further includes:
a distortion monitoring section for detecting a distortion level at a prescribed frequency in an electric signal obtained by optical-to-electrical conversion via the optical receiving section; and
a distortion information transmitting section for transmitting distortion level information about a distortion level detected by the distortion monitoring section to the transmitting device via the first transmission path, and wherein the parameter control section is operable to set the individual modulation parameters such that the distortion level indicated by the distortion level information transmitted via the first transmission path becomes lower than or equal to a prescribed distortion level value.

9. The optical transmission system according to claim 7, further comprising second transmission paths connected between each of the first to n'th terminal devices and the transmitting device,
wherein each of the first to n'th terminal devices further includes:
a quality detecting section for detecting signal quality of the modulated signals transmitted via The prescribed communication lines; and
a quality information transmitting device for transmitting the signal quality information about the signal quality detected by the quality detecting section via the prescribed communication lines, and
wherein the parameter control section is operable to set the individual modulation parameters such that the signal quality indicated by the signal quality information transmitted via the second transmission path satisfies a prescribed requirement.

10. An optical transmission system comprising:
a transmitting device for transmitting a signal via an optical transmission path;
a receiving device for receiving the signal transmitted via the optical transmission path; and
first to n'th (where n is an integer of 2 or more) terminal devices connected via respective prescribed communication lines to the receiving device, wherein the transmitting device comprises:
a modulating section for generating first to n'th modulated signals based on first to n'th data signals to be transmitted to the first to n'th terminal devices, respectively, the first to n'th modulated signals being obtained by modulation with individual modulation parameters;
an optical transmitting section for converting the first to n'th modulated signals generated by the modulating section into an optical signal and for transmitting the optical signal to the receiving device via the optical transmission path;
a data amount estimating section for estimating an amount of data for each of the first to n'th data signals; and
a parameter control section for setting the individual modulation parameters used in the modulating section based on amounts of data for the first to n'th data signals estimated by the data amount estimating section, wherein the receiving device includes:
an optical receiving section for receiving the optical signal transmitted via the optical transmission path and for converting the optical signal into an electric signal; and
an electric transmitting section for transmitting the first to n'th modulated signals contained in the electric signal, which is obtained by conversion via the optical receiving section, to the first to n'th terminals to which the first to n'th modulated signals should be transmitted via the prescribed communication lines, wherein each of first to n'th terminal devices includes a demodulating section for demodulating a modulated signal transmitted via a corresponding one of the prescribed communication lines, and wherein the parameter control section comprises:
a group classifying section for classifying the first to n'th data signals into a plurality of groups in accordance with the amount of data estimated for each of the first to n'th data signals by the data amount estimating section; and
a parameter setting section for setting modulation parameters at the same value for each of data signals classified into the same group by the group classifying section.

11. The optical transmitting system according to claim 10, wherein:
the parameter control section further includes a histogram generating section for generating, based on amounts of data estimated by the data amount estimating section, a histogram in which the amounts of data are divided into prescribed units of divisions; and
the group classifying section is operable to use the histogram generated by the histogram generating section to form the plurality of groups.

12. The optical transmission system according to claim 10, further comprising a first transmission path connected between the receiving device and the transmitting device,
wherein the receiving device further includes:
a distortion monitoring section for detecting a distortion level at a prescribed frequency in an electric signal obtained by optical-to-electrical conversion via the optical receiving section; and a distortion information transmitting section for transmitting distortion level information about a distortion level detected by the distortion monitoring section to the transmitting device via the first transmission path, and wherein the parameter control section is operable to set the individual modulation parameters such that the distortion level indicated by the distortion level information transmitted via the first transmission path becomes lower than or equal to a prescribed distortion level value.

13. The optical transmission system according to claim 10, further comprising second transmission paths connected between each of the first to n'th terminal devices and the transmitting device, wherein each of the first to n'th terminal devices further includes:
a quality detecting section for detecting signal quality of the modulated signals transmitted via the prescribed communication lines; and
a quality information transmitting device for transmitting the signal quality information about the signal quality detected by the quality detecting section via the prescribed communication lines, and wherein the parameter control section is operable to set the individual modulation parameters such that the signal quality indicated by the signal quality information transmitted via the second transmission path satisfies a prescribed requirement.

14. An optical transmission system comprising:
a transmitting device for transmitting a signal via an optical transmission path;
a receiving device for receiving the signal transmitted via the optical transmission path; and
first to n'th (where n is an integer of 2 or more) terminal devices connected via respective prescribed communication lines to the receiving device,
wherein the transmitting device comprises:
a modulating section for generating first to n'th modulated signals based on first to n'th data signals to be transmitted to the first to n'th terminal devices, respectively, the first to n'th modulated signals being obtained by modulation with individual modulation parameters;
an optical transmitting section for converting the first to n'th modulated signals generated by the modulating section into an optical signal and for transmitting the optical signal to the receiving device via the optical transmission path;
a data amount estimating section for estimating an amount of data for each of the first to n'th data signals; and
a parameter control section for setting the individual modulation parameters used in the modulating section based on amounts of data for the first to n'th data signals estimated by the data amount estimating section,
wherein the receiving device includes:
an optical receiving section for receiving the optical signal transmitted via the optical transmission path and for converting the optical signal into an electric signal; and
an electric transmitting section for transmitting the first to n'th modulated signals contained in the electric signal, which is obtained by conversion via the optical receiving section, to the first to n'th terminals to which the first to n'th modulated signals should be transmitted via the prescribed communication lines,
wherein each of first to n'th terminal devices includes a demodulating section for demodulating a modulated signal transmitted via a corresponding one of the prescribed communication lines,
wherein the parameter control section is operable to set the individual modulation parameters so as to have values within a range such that the first to n'th modulated signals satisfy a condition concerning a transmission quality in the optical transmission path, and
wherein the parameter control section further includes:
a condition determination section for determining, based on the individual modulation parameters, whether the first to n'th modulated signals satisfy the condition concerning the transmission quality in the optical transmission path; and
a modifying section for modifying the individual modulation parameters when the condition determination section determines that the condition is not satisfied.

15. The optical transmitting system according to claim 14, wherein the condition is such that a total mean square root optical modulation index, which is determined based on the individual modulation parameters of the first to n'th modulated signals, is lower than or equal to a prescribed value.

16. The optical transmission system according to claim 14, further comprising a first transmission path connected between the receiving device and the transmitting device,
wherein the receiving device further includes:
a distortion monitoring section for detecting a distortion level at a prescribed frequency in an electric signal obtained by optical-to-electrical conversion via the optical receiving section; and
a distortion information transmitting section for transmitting distortion level information about a distortion level detected by the distortion monitoring section to the transmitting device via the first transmission path, and
wherein the parameter control section is operable to set the individual modulation parameters such that the distortion level indicated by the distortion level information transmitted via the first transmission path becomes lower than or equal to a prescribed distortion level value.

17. The optical transmission system according to claim 14, further comprising second transmission paths connected between each of the first to n'th terminal devices and the transmitting device,
wherein each of the first to n'th terminal devices further includes:
a quality detecting section for detecting signal quality of the modulated signals transmitted via the prescribed communication lines; and
a quality information transmitting device for transmitting the signal quality information about the signal quality detected by the quality detecting section via the prescribed communication lines, and
wherein the parameter control section is operable to set the individual modulation parameters such that the signal quality indicated by the signal quality information transmitted via the second transmission path satisfies a prescribed requirement.

18. An optical transmission system comprising:
a transmitting device for transmitting a signal via an optical transmission path;

a receiving device for receiving the signal transmitted via the optical transmission path; and first to n'th (where n is an integer of 2 or more) terminal devices connected via respective prescribed communication lines to the receiving device, wherein the transmitting device comprises:

a modulating section for generating first to n'th modulated signals based on first to n'th data signals to be transmitted to the first to n'th terminal devices, respectively, the first to n'th modulated signals being obtained by modulation with individual modulation parameters;

an optical transmitting section for converting the first to n'th modulated signals generated by the modulating section into an optical signal and for transmitting the optical signal to the receiving device via the optical transmission path;

a data amount estimating section for estimating an amount of data for each of the first to n'th data signals; and a parameter control section for setting the individual modulation parameters used in the modulating section based on amounts of data forte first to n'th data signals estimated by the data amount estimating section, wherein the receiving device includes:

an optical receiving section for receiving the optical signal transmitted via the optical transmission path and for converting the optical signal into an electric signal; and an electric transmitting section for transmitting the first to n'th modulated signals contained in the electric signal, which is obtained by conversion via the optical receiving section, to the first to n'th terminals to which the first to n'th modulated signals should be transmitted via the prescribed communication lines, wherein each of first to n'th terminal devices includes a demodulating section for demodulating a modulated signal transmitted via a corresponding one of the prescribed communication lines, and wherein the individual modulation parameters include the number of subcarriers used for performing discrete multi-tone modulation on each of the first to n'th data signals.

19. The optical transmission system according to claim 18, further comprising a first transmission path connected between the receiving device and the transmitting device, wherein the receiving device further includes:

a distortion monitoring section for detecting a distortion level at a prescribed frequency in an electric signal obtained by optical-to-electrical conversion via the optical receiving section; and a distortion information transmitting section for transmitting distortion level information about a distortion level detected by the distortion monitoring section to the transmitting device via the first transmission path, and wherein the parameter control section is operable to set the individual modulation parameters such that the distortion level indicated by the distortion level information transmitted via the first transmission path becomes lower than or equal to a prescribed distortion level value.

20. The optical transmission system according to claim 18, further comprising second transmission paths connected between each of the first to n'th terminal devices and the transmitting device, wherein each of the first to n'th terminal devices further includes:

a quality detecting section for detecting signal quality of the modulated signals transmitted via the prescribed communication lines; and a quality information transmitting device for transmitting the signal quality information about the signal quality detected by the quality detecting section via the prescribed communication lines, and wherein the parameter control section is operable to set the individual modulation parameters such that the signal quality indicated by the signal quality information transmitted via the second transmission path satisfies a prescribed requirement.

* * * * *

UNITED STATES PATENT AND TRADEMARK OFFICE
CERTIFICATE OF CORRECTION

PATENT NO. : 7,236,701 B2 Page 1 of 1
APPLICATION NO. : 10/648428
DATED : June 26, 2007
INVENTOR(S) : Toshihiko Yasue et al.

It is certified that error appears in the above-identified patent and that said Letters Patent is hereby corrected as shown below:

Column 21
Line 8, "wit individual" should read --with individual--.

Column 22
Line 45, "fox receiving" should read --for receiving--.

Column 23
Line 52, "via The" should read --via the--.

Column 27
Line 23, "of data forte" should read --of data for the--.

Signed and Sealed this

Sixth Day of November, 2007

JON W. DUDAS
*Director of the United States Patent and Trademark Office*